US009020855B2

(12) United States Patent
Kawahara

(10) Patent No.: US 9,020,855 B2
(45) Date of Patent: Apr. 28, 2015

(54) RECORDING/REPRODUCING DEVICE, COMMUNICATION DEVICE, PROGRAM, SYSTEM LSI

(75) Inventor: Eiji Kawahara, Hiroshima (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1715 days.

(21) Appl. No.: 12/093,271

(22) PCT Filed: Nov. 17, 2006

(86) PCT No.: PCT/JP2006/322941
§ 371 (c)(1),
(2), (4) Date: May 9, 2008

(87) PCT Pub. No.: WO2007/058292
PCT Pub. Date: May 24, 2007

(65) Prior Publication Data
US 2009/0164801 A1 Jun. 25, 2009

(30) Foreign Application Priority Data
Nov. 18, 2005 (JP) .................................. 2005-334001

(51) Int. Cl.
G06F 21/00 (2013.01)
G06Q 20/12 (2012.01)
(Continued)

(52) U.S. Cl.
CPC ............ *G06Q 20/1235* (2013.01); *G06F 21/10* (2013.01); *G06F 2221/0704* (2013.01); *G06F 2221/0706* (2013.01); *G11B 20/00086* (2013.01); *G11B 20/0021* (2013.01); *G11B 20/00347* (2013.01); *G11B 20/00731* (2013.01);
(Continued)

(58) Field of Classification Search
USPC .......................................................... 705/59
See application file for complete search history.

(56) References Cited

U.S. PATENT DOCUMENTS 5,892,900 A * 4/1999 Ginter et al. ..................... 726/26
6,477,649 B2 * 11/2002 Kambayashi et al. .......... 726/27
(Continued)

FOREIGN PATENT DOCUMENTS

JP 2000-293439 10/2000
JP 2001-206931 7/2001
(Continued)

OTHER PUBLICATIONS

IEEE 100 The Authoritative Dictionary of IEEE Standards Terms, Seventh Edition.*
(Continued)

*Primary Examiner* — Zeshan Qayyum
(74) *Attorney, Agent, or Firm* — Wenderoth, Lind & Ponack, L.L.P.

(57) ABSTRACT

A reading unit reads, from a memory card, encrypted license information and license management information corresponding thereto. A decryption unit decrypts the encrypted license information, and thereby obtains license information in plain text. An operation execution executes an operation based on the license information in plain text. The license management information indicates, for each operation for the content, a type of identifier necessary for decrypting the encrypted license information. The decryption decrypts the encrypted license information with use of an identifier corresponding to the operation to be executed, the identifier being selected from among a plurality of types of identifier indicated by the license management information.

11 Claims, 26 Drawing Sheets

(51) Int. Cl.
*G06F 21/10* (2013.01)
*G11B 20/00* (2006.01)
*H04N 9/804* (2006.01)
*H04N 21/418* (2011.01)
*H04N 21/4408* (2011.01)
*H04N 21/45* (2011.01)
*H04N 21/454* (2011.01)
*H04N 5/781* (2006.01)
*H04N 5/85* (2006.01)
*H04N 5/913* (2006.01)

(52) U.S. Cl.
CPC .... *G11B 20/00847* (2013.01); *G11B 20/00855* (2013.01); *G11B 2220/2575* (2013.01); *G11B 2220/61* (2013.01); *H04N 5/781* (2013.01); *H04N 5/85* (2013.01); *H04N 9/8042* (2013.01); *H04N 21/4181* (2013.01); *H04N 21/4408* (2013.01); *H04N 21/4516* (2013.01); *H04N 21/454* (2013.01); *H04N 2005/91328* (2013.01); *H04N 2005/91364* (2013.01)

(56) References Cited

U.S. PATENT DOCUMENTS

| | | | |
|---|---|---|---|
| 6,873,975 | B1 | 3/2005 | Hatakeyama et al. |
| 7,266,391 | B2 * | 9/2007 | Warren .......................... 455/557 |
| 7,395,549 | B1 * | 7/2008 | Perlman et al. ................. 726/10 |
| 2002/0107806 | A1 | 8/2002 | Higashi et al. |
| 2002/0174354 | A1 * | 11/2002 | Bel et al. ....................... 713/193 |
| 2004/0100978 | A1 * | 5/2004 | Saito et al. .................... 370/401 |
| 2010/0121741 | A1 * | 5/2010 | Hotelling et al. ............... 705/27 |

FOREIGN PATENT DOCUMENTS

| | | |
|---|---|---|
| JP | 2002-9966 | 1/2002 |
| JP | 2002-342518 | 11/2002 |
| JP | 2003-22610 | 1/2003 |
| JP | 2004-139473 | 5/2004 |

OTHER PUBLICATIONS

International Search Report issued Feb. 13, 2007 in the International (PCT) Application of which the present application is the U.S. National Stage.

* cited by examiner

FIG. 5A

CLASS STRUCTURE OF CONTENT MANAGEMENT INFORMATION

| CONTENT INFORMATION | | OPERATION RESTRICTION INFORMATION | |
|---|---|---|---|
| CONTENT ID | TITLE | OPERATION TYPE INFORMATION | AUTHENTICATION INFORMATION TYPE ID |

FIG. 5B

BIT ASSIGNMENT

- OPERATION TYPE INFORMATION: b[3] b[2] b[1] b[0]
  b[3]: RESERVE  b[2]: EDIT  b[1]: COPY  b[0]: PLAYBACK
  1: VALID  0: INVALID
- AUTHENTICATION INFORMATION: CORRESPOND TO A BIT VALUE OF OPERATION TYPE INFORMATION
  0: REQUIRED  1: NOT REQUIRED
- TYPE ID: b[7] b[6] b[5] b[4] b[3] b[2] b[1] b[0]
  b[7] b[6]: CORRESPOND TO B3 OF OPERATION TYPE INFORMATION
  b[5] b[4]: CORRESPOND TO B2 OF OPERATION TYPE INFORMATION
  b[3] b[2]: CORRESPOND TO B1 OF OPERATION TYPE INFORMATION
  b[1] b[0]: CORRESPOND TO B0 OF OPERATION TYPE INFORMATION
    00: NONE
    01: PIN CODE
    10: DEVICE ID OF RECORDING/REPRODUCING DEVICE
    11: ORGANIZATION CODE

FIG. 5C

INSTANCE OF CONTENT MANAGEMENT INFORMATION

| 00010101 | "EUROPEAN JOURNEY" | 0111 | 0010 | 00001000 |
|---|---|---|---|---|
| 00010111 | "DRAMA XX" | 0011 | 0010 | 00000100 |
| 00011101 | "NEWS TODAY" | 0111 | 0010 | 00001000 |
| ... | ... | ... | ... | ... |

FIG. 8A

CLASS STRUCTURE OF LICENSE ACQUISITION INFORMATION

| CONTENT INFORMATION | | OPERATION TYPE INFORMATION | TYPE ID | ENCRYPTED INFORMATION ID |
|---|---|---|---|---|
| CONTENT ID | TITLE | | | |

FIG. 8B

BIT ASSIGNMENT

- OPERATION TYPE INFORMATION: b[3] b[2] b[1] b[0]
  b[3]: RESERVE  b[2]: EDIT  b[1]: COPY  b[0]: PLAYBACK
  1: VALID  0: INVALID
- TYPE ID: b[7] b[6] b[5] b[4] b[3] b[2] b[1] b[0]
  b[7] b[6]: CORRESPOND TO B3 OF OPERATION TYPE INFORMATION
  b[5] b[4]: CORRESPOND TO B2 OF OPERATION TYPE INFORMATION
  b[3] b[2]: CORRESPOND TO B1 OF OPERATION TYPE INFORMATION
  b[1] b[0]: CORRESPOND TO B0 OF OPERATION TYPE INFORMATION
  00: NONE
  01: PIN CODE
  10: DEVICE ID OF RECORDING/REPRODUCING DEVICE
  11: ORGANIZATION CODE

FIG. 8C

INSTANCE OF LICENSE ACQUISITION INFORMATION

| 00010101 | "EUROPEAN JOURNEY" | 0010 | 00001000 | $77WgYJQEHAaBKBEhJ** |
|---|---|---|---|---|

FIG. 12A
CLASS STRUCTURE OF LICENSE MANAGEMENT INFORMATION | CLASS STRUCTURE OF LICENSE INFORMATION (IN PLAIN TEXT)

| CONTENT INFORMATION | | OPERATION TYPE INFORMATION | TYPE ID |
|---|---|---|---|
| CONTENT ID | TITLE | | |

| CONTENT INFORMATION | | OPERATION TYPE INFORMATION | ISSUER INFORMATION |
|---|---|---|---|
| CONTENT ID | TITLE | | |

FIG. 12B
INSTANCE OF LICENSE MANAGEMENT INFORMATION | INSTANCE OF LICENSE INFORMATION

| | | | |
|---|---|---|---|
| 00010101 | "EUROPEAN JOURNEY" | 0010 | 00001000 |
| 00010111 | "DRAMA XX" | 0010 | 00000100 |

| | | | |
|---|---|---|---|
| 00010101 | "EUROPEAN JOURNEY" | 0010 | "ABC COMPANY" |
| 00010111 | "DRAMA XX" | 0010 | "ABC COMPANY" |

FIG. 12C
ENCRYPTED LICENSE INFORMATION

@#$55MIIGWgYJKoZIhvcNAQc
CoIIGSzCCBkcCAQExCzAJBgUr
DgMCGgUAMFcGCSqGSIb3DQE
HAaBKBEhJ==

FIG. 12D
BIT ASSIGNMENT

- OPERATION TYPE INFORMATION: b[3] b[2] b[1] b[0]
  b[3]: RESERVE  b[2]: EDIT  b[1]: COPY  b[0]: PLAYBACK
  1: VALID  0: INVALID
- TYPE ID: b[7] b[6] b[5] b[4] b[3] b[2] b[1] b[0]
  b[7] b[6]: CORRESPONDS TO B3 OF OPERATION TYPE INFORMATION
  b[5] b[4]: CORRESPONDS TO B2 OF OPERATION TYPE INFORMATION
  b[3] b[2]: CORRESPONDS TO B1 OF OPERATION TYPE INFORMATION
  b[1] b[0]: CORRESPONDS TO B0 OF OPERATION TYPE INFORMATION
  00: NONE
  01: PIN CODE
  10: DEVICE ID OF RECORDING/REPRODUCING DEVICE
  11: ORGANIZATION CODE

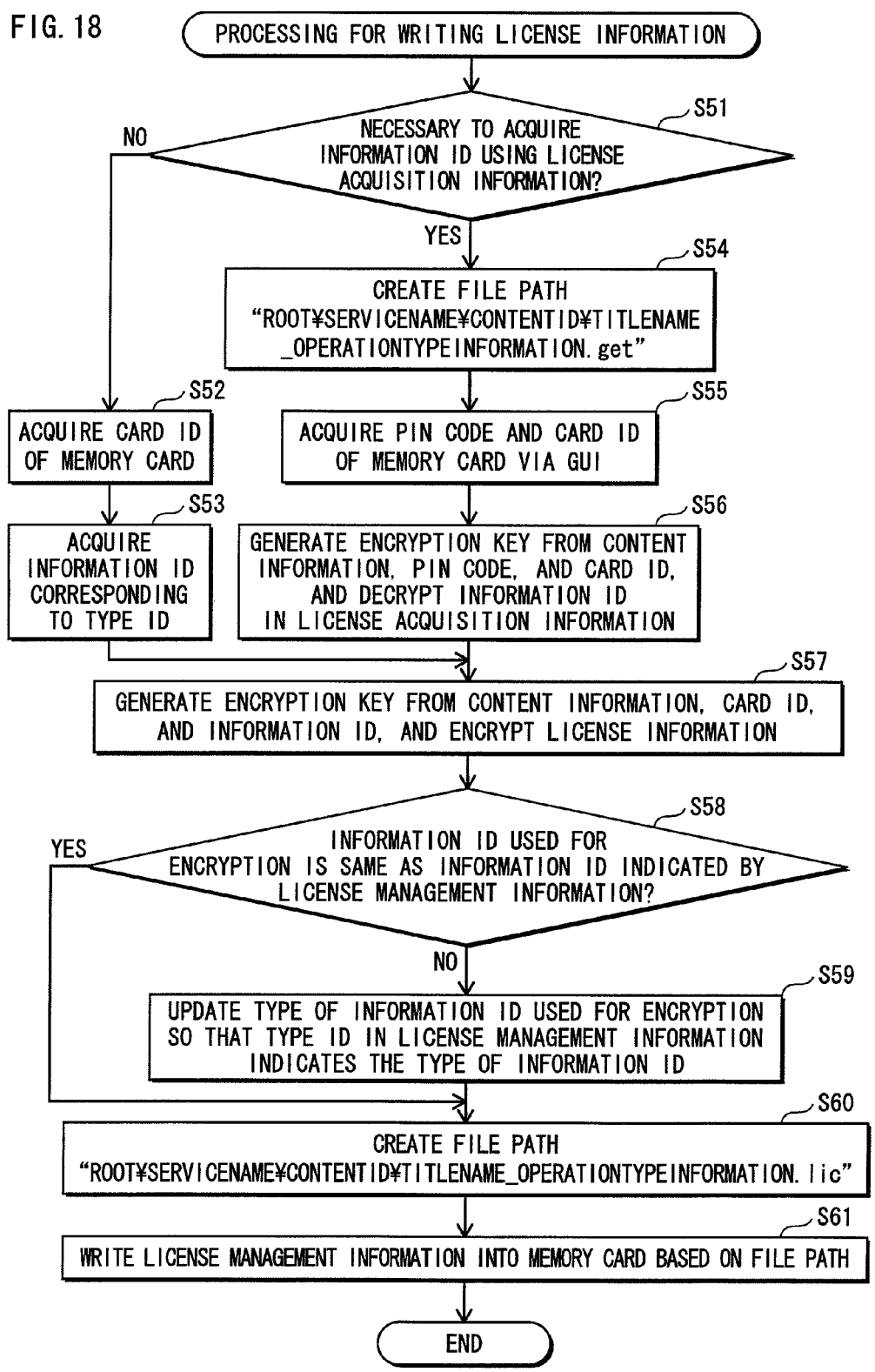

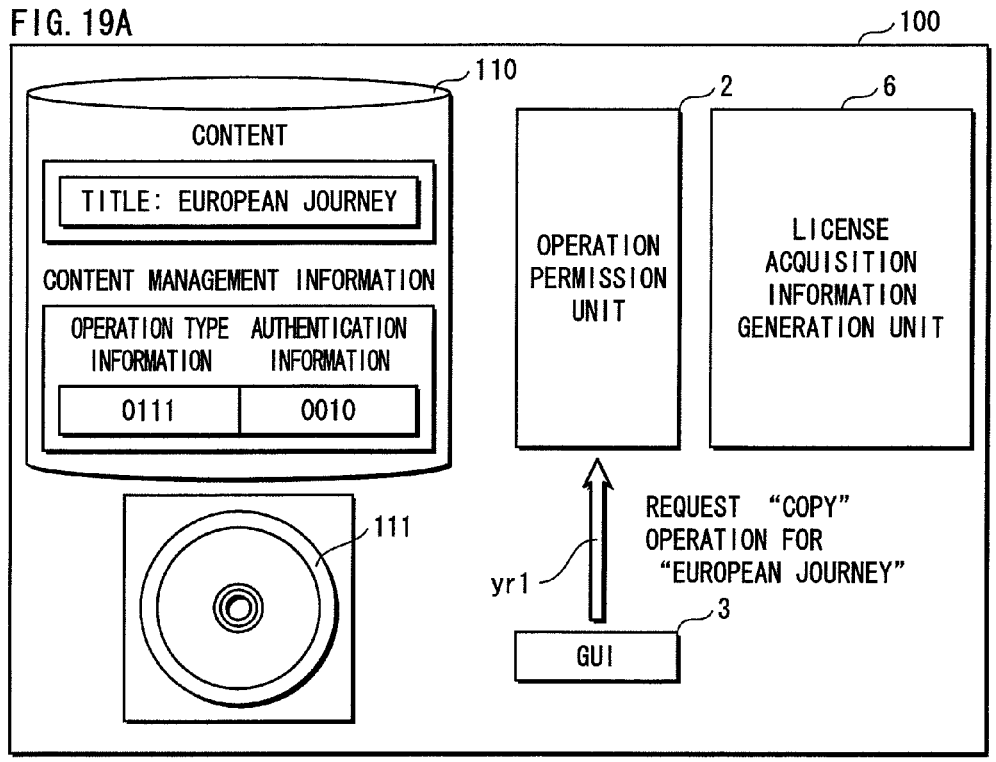
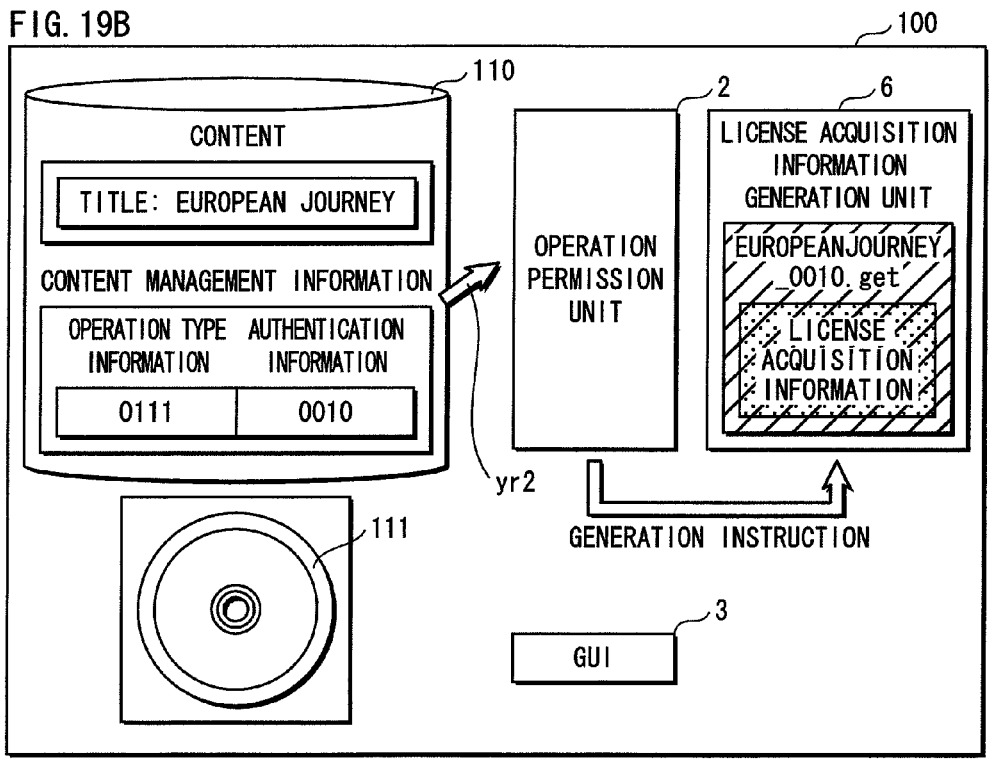

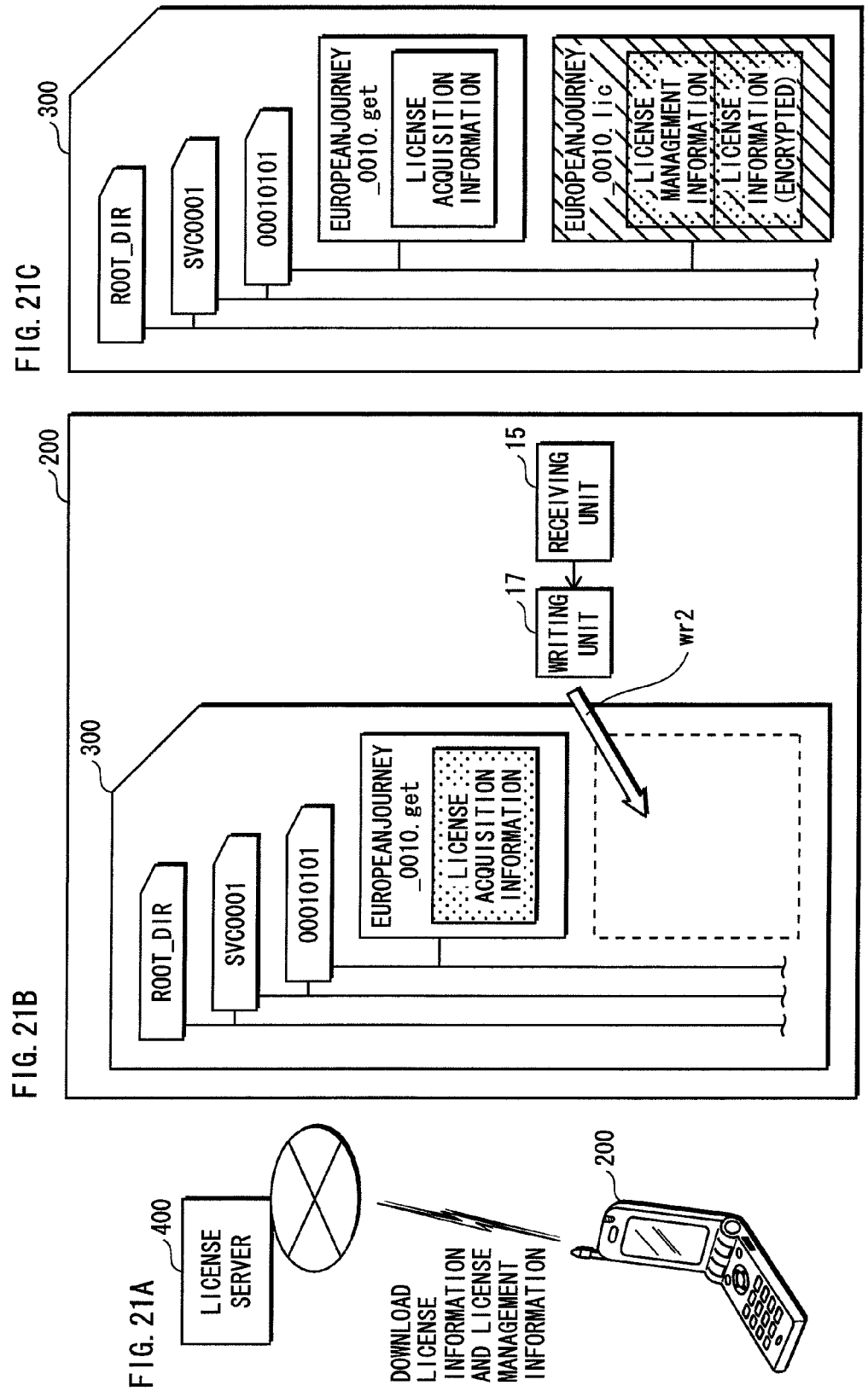

SUBSTRATE OF RECORDING/REPRODUCING DEVICE

RECORDING/REPRODUCING DEVICE, COMMUNICATION DEVICE, PROGRAM, SYSTEM LSI

BACKGROUND OF THE INVENTION

1. Technical Field

The present invention relates to a license-supply technique.

2. Background Art

Information that specifies the use of a content includes two types of information. One type of information (hereinafter referred to as content management information) is supplied to an apparatus with the content when the content is supplied to the apparatus. The other type of information (hereinafter referred to as license information) is purchased by a user who has received the supply of the content. The license-supply technique is a technique to supply the latter-mentioned license information to a user.

For example, assume that the copy of the content is not permitted by the content management information that is supplied to a user with the content. In a case where the user desires to copy the content, the user can copy the content by purchasing, on a subsequent day, the license information that specifies "a permitted number of times of copying is once".

Techniques for copying a content according to the content management information include a technique described in the following Patent Document 1. This known technique described in Patent Document 1 includes a method to analyze the content management information. When a content stored in an HD drive is to be copied on a DVD, copy information is analyzed first. Then, the result of the analysis determines, for example, whether to permit copying of the content, or to prohibit the copying while permitting only to move the content.

Also, techniques for restricting the reading of a content according to the content management information include a technique described in the following Patent Document 2. In this known technique described in Patent Document 2, when a content is to be recorded onto an external recording medium, the phone number of a mobile phone is also recorded thereto in connection with the content. This enables the content to be read only when a phone number matches with the phone number of the mobile phone.

[Patent Document 1] Japanese Laid-Open Patent Application No. 2003-22610; and

[Patent Document 2] Japanese Patent Publication No. 3416621.

However, in the conventional technologies described above, the content management information is added to a content and written to a recording medium when the content is to be recorded. Therefore, what type of operation can be performed on the content, and in what kind of environment the content can be used, are permanently determined by the description of the content management information recorded on the recording medium together with the content. Therefore, the type of permitted operation and the kind of environment in which the content is permitted to be read cannot be changed after the content management information is recorded onto the recording medium, resulting in causing inconvenience to the user.

Here, if a user purchases the above-described license, the range of permitted operations can be increased to some degree. However, even though the user purchases such a license, the environment in which a content is permitted to be read cannot be changed after the content management information is recorded onto the recording medium, which has been inconvenient to the user.

Such restrictions to the reading environment may be caused by an encryption method used when storing the content management information and the license information. Generally, the content management information and the license information are encrypted with use of an identification unique to an apparatus, and an identification unique to a recording medium. As a result, the content management information and the license information become unique to the specific apparatus and the specific recording medium, and cannot be used for any other apparatus and recording medium but the specific apparatus and recording medium.

Because of such restrictions on the recording medium and the apparatus, which are caused by the encryption method, even though a single person desires to use the content with an apparatus other than the specific apparatus, or a plurality of persons who belong to a particular organization desire to use the content together, these demands cannot be satisfied. In conventional technologies, a place to use the content is restricted to an apparatus having the acquired content management information or the license information, which lacks in convenience.

The object of the present invention is to provide a recording/reproducing device that favorably changes an entity that uses a content, and a place where the content is permitted to be used.

SUMMARY OF THE INVENTION

The above-described problems are solved by a recording/reproducing device comprising: an acquisition unit operable to acquire license information that has been encrypted and license management information corresponding thereto; a decryption unit operable to decrypt the encrypted license information and obtain license information in plain text; and an execution unit operable to execute an operation for a content, based on the license information in plain text, wherein the license management information indicates, for each operation for the content, a type of identifier necessary for decrypting the encrypted license information, and the decryption of the encrypted license information is performed by using an identifier that corresponds to the type indicated by the license management information, the identifier being selected from among a plurality of types of identifiers.

Effects of the Invention

The above-described license management information indicates a type of identifier that is used for decryption performed by a decryption unit. When an identifier type indicated by the information is used to perform the decryption, the encrypted license information can be decrypted. Even if the user were to change an identifier necessary to decrypt the license information, as long as the identifier is indicated by the license management information, the license information is legitimately decrypted by the recording/reproducing device. Therefore, when an identifier unique to an apparatus is adopted as an identifier for decryption, a place to use a certain content can be restricted to a specific apparatus. Also, when an identifier unique to a single person is adopted as the identifier for the decryption, an entity that uses the content can be restricted to the specific person. Conversely, if an identifier unique to a specific organization is adopted as the identifier for the decryption, an entity that uses the content can be expanded to all the members in the organization.

With the above-described structure, a place to use a content and an entity that uses the content can be changed as desired. Therefore, the operations of the content are performed depending on the situation in which the content is used, which enhances convenience to the user.

Furthermore, when moving the license information via the portable recording medium, the license information is encrypted with use of information that only the user knows and a device ID unique to the portable recording medium. Therefore, it is possible to provide security that does not permit others to use the license information, and that does not permit the license information to be copied onto other recording mediums.

Optionally, the following technical matters can be added to the technical matter of the above-described recording/reproducing device to have a specific structure, thereby further increasing the effect of this invention.

<Technical Matter 2>

The stated recording/reproducing device further comprises: an authentication unit operable to execute authentication by comparing the license management information and the license information in plain text obtained as a result of the decryption by the decryption unit, wherein
the execution of the operation is performed only when consistency between the license information and the license management information is certified by a comparison result of the authentication unit.

When the above-described technical matter is added to the recording/reproducing device of the present invention, the correspondence between the encrypted license information and the license management information is judged to determine whether or not the license management information is tampered. Therefore, it is possible to securely prevent operations from being executed according to the unauthorized license management information.

<Technical Matter 3>

The license information includes content information and operation type information,
the license management information includes content information and operation type information,
each piece of the content information includes an identifier of a content and/or a title character string,
each piece of the operation type information has a bit string, each bit corresponds to a different one of the operations for the content, and each bit value indicates whether an execution of the corresponding operation is valid or invalid, and
the comparison during the authentication by the authentication unit is performed by judging consistency between (i) the content information and the operation type information that are included in the license management information and (ii) the content information and the operation type information that are included in the license information.

When the above-described technical matter is added to the recording/reproducing device of the present invention, the operation type information can indicate operation types whose number corresponds to the bit length of the operation type information. Also, the identifier type information can indicate identifier types whose number corresponds to the bit length of the identifier type information. Each of the information can indicate the type whose number corresponds to the bit length of its own. Therefore, in a case where the license information and the license management information, which include the operation type information and the identifier type information, are used by being resided in a memory, the number of identifier types and the number of operation types can be set to appropriate numbers by taking into consideration the size of the memory.

<Technical Matter 4>

The license information and the license management information have been written on a portable recording medium, and
the recording/reproducing device includes:
an updating unit operable to update the license information and the license management information according to the execution of the operation, wherein
the update of the license information and the license management information is executed by
changing a bit value of a bit string of operation type information corresponding to an operation that has been executed, and
writing back, to the portable recording medium, (i) encrypted license information obtained by encrypting the license information in plain text whose bit value has been changed and (ii) the license management information whose bit value has been changed.

When the above-described technical matter is added to the recording/reproducing device of the present invention, a disadvantage that a same operation is repeatedly executed due to a same license information can be prevented.

<Technical Matter 6>

The license management information and the license information are stored in a file that is specified by a predetermined file path,
the file path includes a first folder name, a second folder name and a first file name,
the first folder name corresponds to a service name that is a provider of the content,
the second folder name corresponds to a content identifier included in the content information, and
the first file name corresponds to a combination of (i) a title name included in the content information and (ii) the bit string corresponding to the operation type information included in the license management information.

When the above-described technical matter is added to the recording/reproducing device of the present invention, the file path, which is uniquely determined according to the content and an operation to be executed, specifies a destination to acquire the license information that has been encrypted and the license management information. Therefore, in the recording/reproducing device, the license information and the license management information can be acquired without causing a user any trouble. Also, acquisition of the wrong license information is prevented.

<Technical Matter 7>

The license management information further includes identifier type information,
the identifier type information includes:
a plurality of partial bits wherein each bit corresponds to a different one of the plurality of operations, each bit value indicates the type of identifier to be used for decryption when executing the corresponding operation, and
the identifier used by the decryption unit is specified by a bit value corresponding to an operation to be executed, the bit value being selected from among the plurality of bit values of the identifier type information in the license management information.

When the above-described technical matter is added to the recording/reproducing device of the present invention, in a case where an identifier used for encryption is set to be an identifier unique to the recording/reproducing device, the use of certain license information can be restricted to a specific recording/reproducing device, thereby ensuring robust security.

<Technical Matter 9>

The content has been stored on a recording medium in correspondence with content management information, the content management information includes operation type information and authentication information, the operation type information includes a bit string, each bit corresponds to a different one of the operations for the content, and each bit value indicates whether an execution of the corresponding operation is valid or invalid, the authentication information includes a bit string, each bit corresponds to the different one of the operations for the content, and each bit value indicates whether or not authentication processing is necessary for the execution of the corresponding operation, and the acquisition of the license information is performed when the authentication information indicates that the authentication processing is necessary for the execution of the corresponding operation.

When the above-described technical matter is added to the recording/reproducing device of the present invention, whether or not the license information is necessary can be set for each content. Therefore, in a case where a variety of contents exist on a recording medium, the acquisition of the license information can be restricted to a case where a specific operation is performed on a specific content. With this restriction, the increase of the processing load, which is caused by the acquisition of the license information, is kept at minimum.

<Technical Matter 10>

The recording/reproducing device is a standalone device and performs processing to write license acquisition information onto a portable recording medium, the acquisition of the encrypted license information and the license management information is performed by an access to the portable recording medium on which the license acquisition information has been written, the license acquisition information includes content information that is information indicating a content to be an operation target, operation type information indicating a type of an operation to be executed, identifier type information indicating a type of an identifier to be used for encryption, and an identifier used for the encryption, and the license information on the portable recording medium is downloaded by a portable communication device having the portable recording medium, corresponds to a combination of (i) the content indicated by the content information and (ii) the operation indicated by the operation type information, the combination being included in the license acquisition information, and has been encrypted based on an identifier whose type is indicated by the identifier type information included in the license acquisition information.

With the above-described technical matter being added to the recording/reproducing device of the present invention, when the license information is to be acquired, the recording/reproducing device generates the license acquisition information, and writes the license acquisition information on a portable recording medium. Therefore, even though the recording/reproducing device does not have a communication function, the recording/reproducing device can acquire, via the portable recording medium, the license information necessary for the execution of operations whose use is restricted.

<Technical Matter 11>

The license acquisition information is stored in a file that is specified by a predetermined file path, the file path includes a first folder name, a second folder name and a first file name, the first folder name corresponds to a service name that is a provider of the content, the second folder name corresponds to a content identifier included in the content information, and the first file name corresponds to a combination of (i) a title name included in the content information and (ii) the bit string corresponding to the operation type information included in the license management information.

When the above-described technical matter is added to the recording/reproducing device of the present invention, the file path, which is uniquely determined according to the content and the operation to be executed, specifies a destination to write the license acquisition information. Therefore, in a communication device that has a license acquisition function, the license information and the license management information can be acquired without causing a user any trouble. Also, acquisition of the wrong license information is prevented.

BRIEF DESCRIPTION OF THE DRAWING

FIG. 5A is a diagram showing the class structure of content management information;

FIG. 5B is a diagram showing the bit assignment of operation type information, authentication information, and type IDs in the content management information;

FIG. 5C is a diagram showing the instances of content information and operation restriction information;

FIG. 8A is a diagram showing the class structure of license acquisition information;

FIG. 8B is a diagram showing the bit assignment of the license acquisition information;

FIG. 8C is a diagram showing the instance of the license acquisition information used for a content operation performed on a desired content to be recorded onto the memory card 300

FIG. 12A is a diagram showing the class structures of the license information and the license management information, which are for a content operation performed on a desired content to be recorded onto the memory card 300;

FIG. 12B is a diagram showing the instances of the license information and the license management information for a content operation performed on a desired content to be recorded onto the memory card 300;

FIG. 12C is a diagram showing one example of the encrypted license information;

FIG. 12D is a diagram showing the bit assignment of the license information and the license management information;

FIG. 18 is a flowchart showing the steps of the processing performed by a writing unit 17;

FIG. 19A is a diagram showing a stage where a user has requested a copy operation for the content "European journey";

FIG. 19B is a diagram showing a stage where the operation execution unit 2 has referred to the operation type information and the authentication information in the content management information;

FIG. 21A is a diagram showing that the portable communication device 200 is downloading the license information and the license management information;

FIG. 21B is a diagram showing a stage where the downloaded license information and license management information are being written onto the memory card 300;

FIG. 21C is a diagram showing the storage content of the memory card 300 after the writing has been performed;

DESCRIPTION OF CHARACTERS

Figure 1:
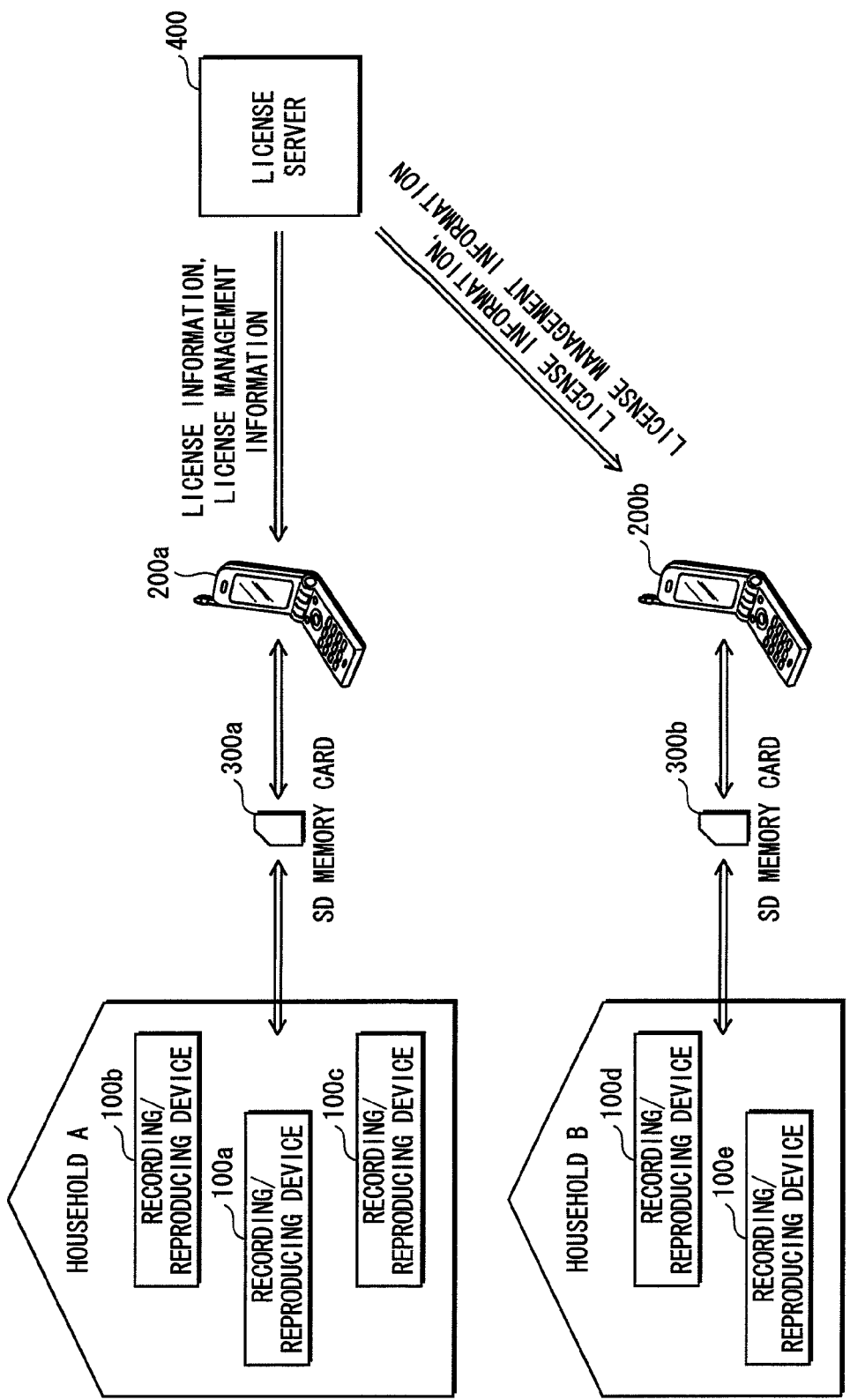
FIG. 1 is a diagram showing a content use system composed of recording/reproducing devices 100a to 100e, portable communication devices 200a and 200b, memory cards 300a and 300b, and a license server 400.

1 storage
2 operation execution unit
3 GUI unit
4 operation permission unit
5 device ID storage unit
6 license acquisition information generation unit
7 writing unit
8 reading unit
9 decryption unit
10 authentication unit
11 reading unit
12 GUI unit
13 decryption unit
14 sending unit
15 receiving unit
16 encryption unit
17 writing unit

DETAILED DESCRIPTION OF THE INVENTION (First Embodiment)

The following describes the first embodiment of the present invention, with reference to the accompanying diagrams.

FIG. 1 is a diagram showing a content use system composed of recording/reproducing devices 100a to 100e, portable communication devices 200a and 200b, memory cards 300a and 300b, and a license server 400. The recording/reproducing devices 100a to 100e are standalone type devices that are used by being set in the households of users. When executing a content operation for a content recorded on a recording medium, the recording/reproducing devices 100a to 100e judge whether or not the content operation is permitted, by referring to content management information corresponding to the content. Then, in a case where a license is required to perform the content operation, the recording/reproducing devices 100a to 100e refer to license information stored in the memory cards 300a and 300b, and perform an operation with respect to the content.

Each of the portable communication devices 200a and 200b is owned by different users. In a case where the license needs to be purchased for using the content, the portable communication devices 200a and 200b download the license information and the license management information that are the objects of the license.

The memory cards 300a and 300b are the recording media that mediate between the recording/reproducing devices 100a to 100e and the portable communication devices 200a and 200b. The memory cards 300a and 300b store the license information and the license management information that have been downloaded by the portable communication devices 200a and 200b. The stored license information and the license management information are then provided to the recording/reproducing devices 100a to 100e. The memory cards 300a and 300b also store information (referred to as license acquisition information hereinafter) that is for requesting the purchase of the license. The license acquisition information is recorded on the memory cards 300a and 300b by the recording/reproducing devices 100a to 100e, and then provided to the portable communication devices 200a and 200b.

The license server 400 distributes the license information and the license management information, according to the requests from the memory cards 300a and 300b.

This concludes the descriptions of the content use system.

The license information is encrypted and recorded onto the memory card 300. The usage range of the content varies depending on the type of identifier used for the encryption. The identifier used for the encryption is referred to as "information ID".

In the present embodiment, the following three types of identifiers are described as an example of the information ID.

Device ID

The device ID is a code that is uniquely allocated to the recording/reproducing device, and exists in a secure storage element in the recording/reproducing device.

PIN Code

The PIN code is the information that is known by only a user, such as a security code.

Organization Code

The organization code is the information that is uniquely allocated to an organization (company, government agency, corporation) to which a user belongs. In a case where the portable communication devices 200a and 200b are lent from an organization, the users of the portable communication devices 200a and 200b can obtain the organization code by viewing the storage contents of the SIM cards contained in the portable communication devices 200a and 200b.

Figure 2:
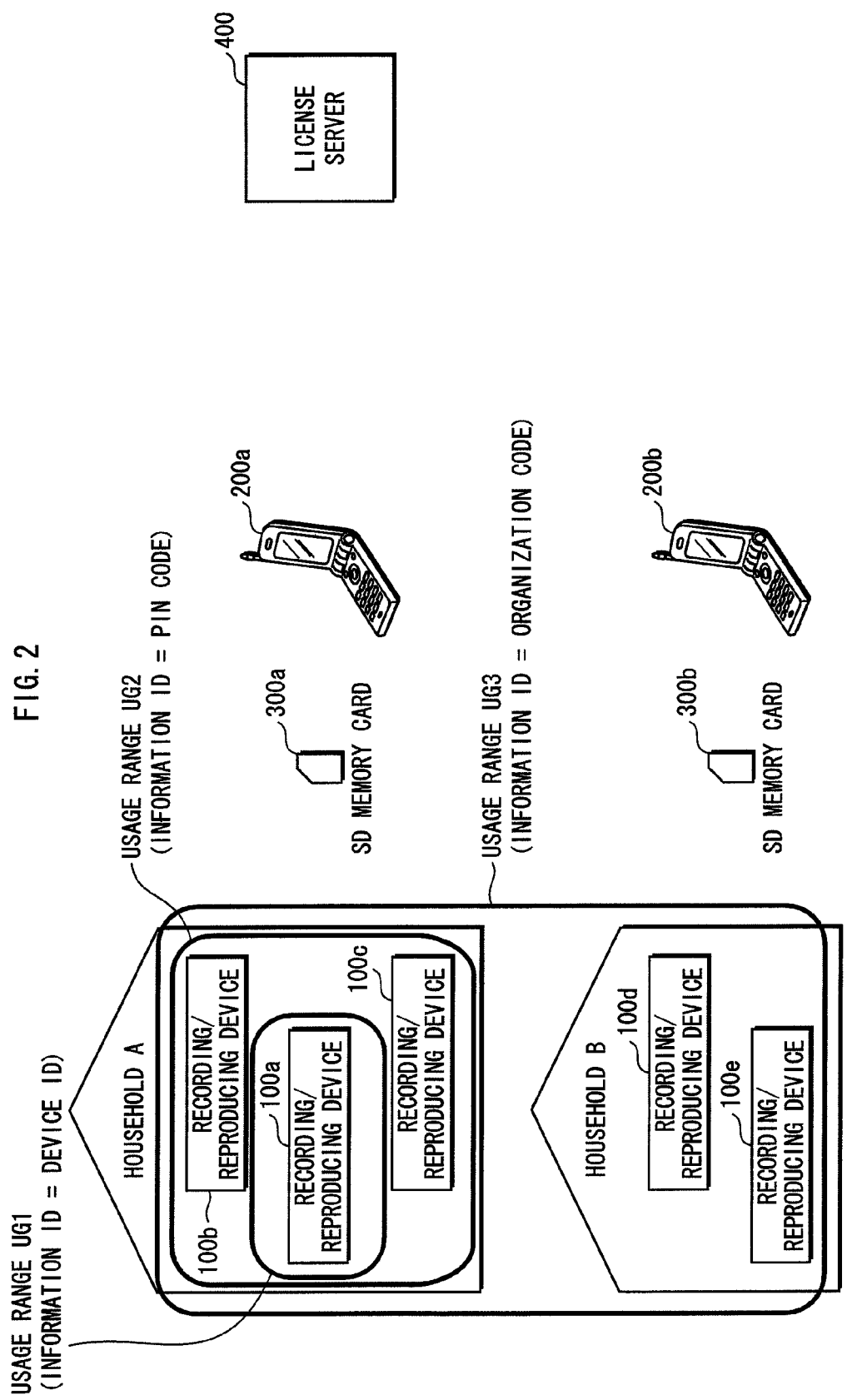
FIG. 2 is a diagram schematically showing the relations of the types of information IDs and the usage ranges.

FIG. 2 schematically shows the relations of the types of information IDs and the usage ranges.

FIG. 2 is made by adding the usage ranges to FIG. 1 that is adopted as the original diagram of FIG. 2. In FIG. 2, a usage range ug1 in a case of the information ID being the device ID, a usage range ug2 in a case of the information ID being the PIN code, and a usage range ug3 in a case of the information ID being the organization code.

The device ID is the information ID that is unique to the recording/reproducing device 100a. Therefore, when the device ID is used to decrypt the license information, the usage range ug1 of the content is within the recording/reproducing device 100a. The PIN code is the information ID that is unique to a user who owns the portable communication device 200a. Therefore, when the PIN code is used as the information ID, the usage range ug2 of the content is within all of the devices that are permitted to be used by the user (in FIG. 2, the devices include the recording/reproducing devices 100a to 100c that exist in the household A).

The organization code is the information ID that is unique to an organization to which users who own the portable communication devices 200a and 200b belong. Therefore, when the organization code is used as the information ID, the usage range ug3 of the content is within all of the devices that are permitted to be used by the members of the organization to which the users who own the portable communication devices 200a and 200b belong (in FIG. 2, the devices include the recording/reproducing devices 100a to 100e that exist in the households A and B). As described above, in the system shown in FIG. 1, the usage range of the content varies depending on a type of information ID. This concludes the descriptions of the usage ranges.

Figure 3:
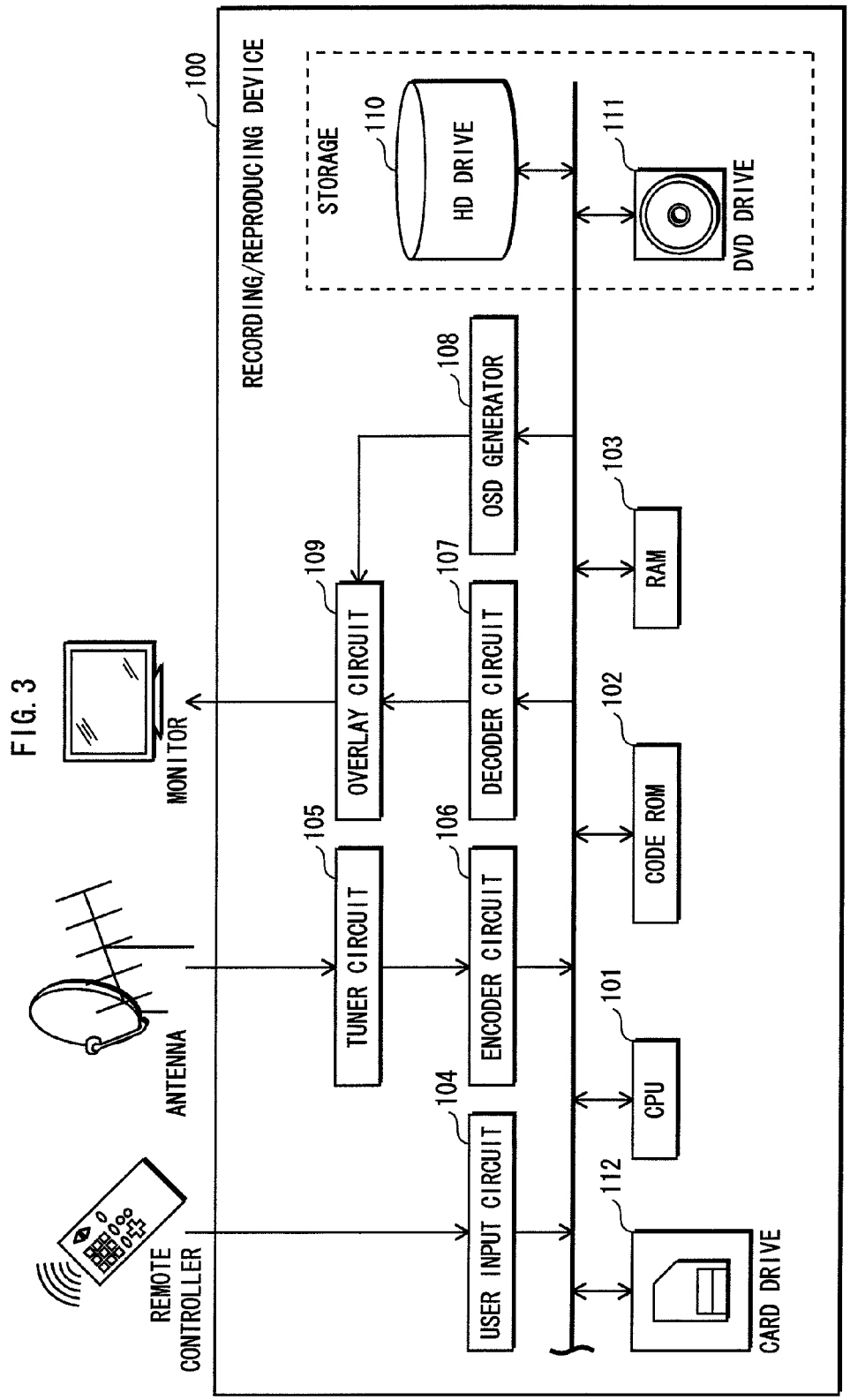
FIG. 3 is a diagram showing the hardware configuration of the recording/reproducing device 100.
Figure 4:
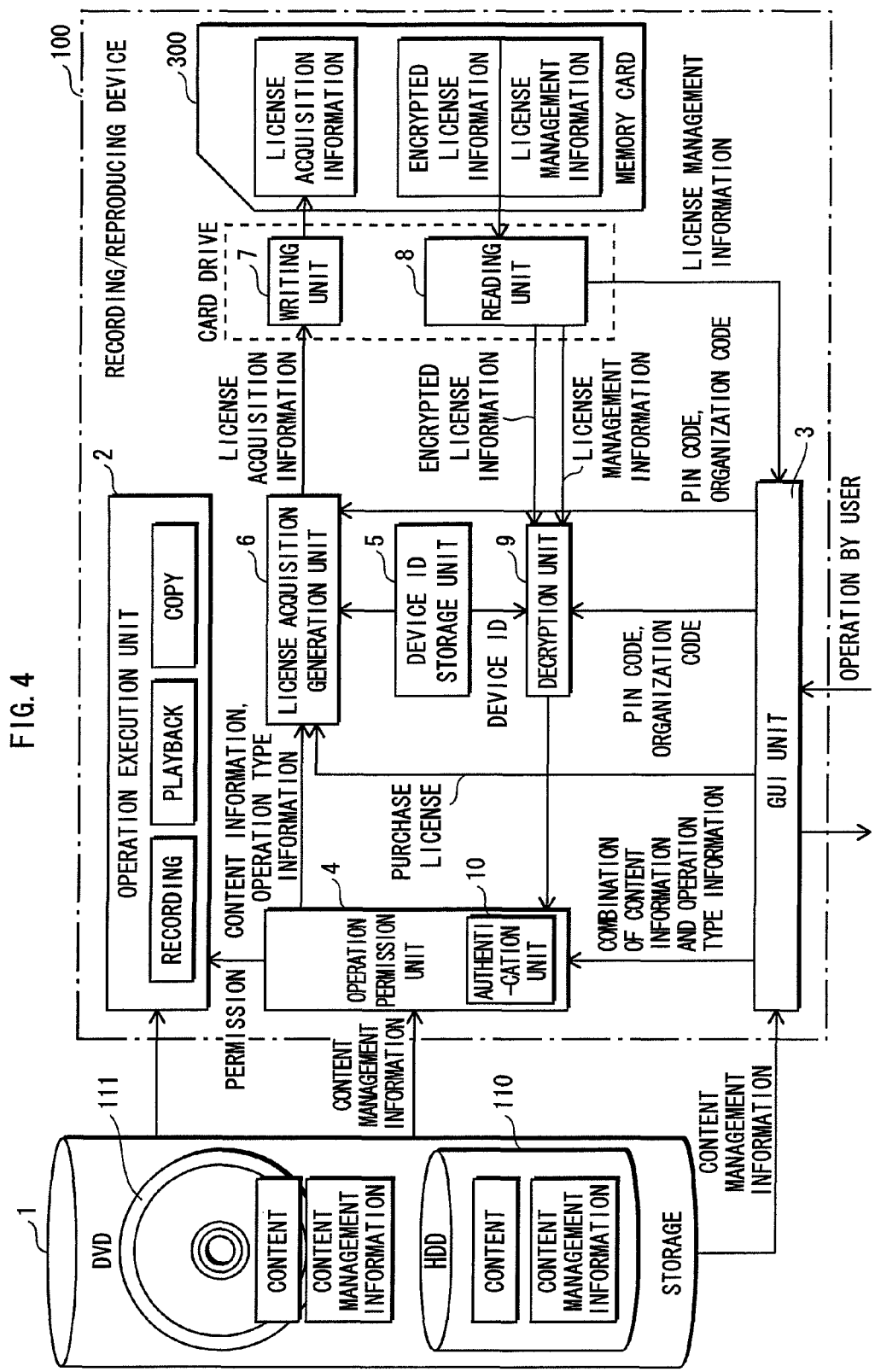
FIG. 4 is a block diagram showing the internal structure of the recording/reproducing device 100.

The recording/reproducing devices 100a to 100e shown in FIG. 1 share a common internal structure. FIGS. 3 and 4 show the common internal structure. The following describes the internal structure that is common to the recording/reproducing devices 100a to 100e (hereinafter referred to as the internal structure of the recording/reproducing device 100), with reference to the FIGS. 3 and 4.

FIG. 3 is a diagram showing the hardware configuration of the recording/reproducing device 100. A program of the present invention uses the hardware resource in FIG. 3 to realize the data processing.

As shown in FIG. 3, the hardware configuration of the recording/reproducing device includes a CPU 101, a code ROM 102, a RAM 103, a user input circuit 104, a tuner circuit 105 that demodulates a broadcast signal from an antenna, an encoder circuit 106 that performs coding processing on received data, a decoder circuit 107 that decrypts data that has been compression-coded, an OSD generator 108 that generates an On-screen display image, an overlay circuit 109 that superimposes the OSD image that is generated by the OSD generator 108 on an image signal generated by the decoder circuit 107, an HD drive 110, a DVD drive 111, and a card drive 112.

An operation request from a user is accepted when the user input circuit 104 receives an output signal from a remote controller. The remote controller receives, from a user, the operation request on a graphical user interface (hereinafter called GUI) that has been hierarchized. In order to receive the operation request, the remote controller includes (i) a "menu key" for activating a menu options that constitute the GUI, (ii) an "arrow key" for changing states of GUI components that constitute the menu, (iii) a "enter key" for performing confirmation operations on GUI components that constitute the menu, and (iv) a "return key" for returning to a higher menu option in the hierarchized menu. When a user presses a key, an infrared signal corresponding to the pressed key is output. Upon receipt of the infrared signal, the remote controller inputs the operation request.

This concludes the descriptions of the hardware configuration of the recording/reproducing device 100. When the internal structure of the recording/reproducing device 100 is functionally shown, by focusing on the functions of the program stored in the code ROM 102, the internal structure of the recording/reproducing device 100 is formed as shown in the functional block diagram of FIG. 4. FIG. 4 is a block diagram showing the internal structure of the recording/reproducing device 100. As shown in FIG. 4, the recording/reproducing device 100 is composed of a storage 1, an operation execution unit 2, GUI unit 3, an operation permission unit 4, a device ID storage unit 5, a license acquisition information generation unit 6, a writing unit 7, a reading unit 8, a decryption unit 9, and an authentication unit 10.

<Storage 1>

The storage 1 is composed of the HD drive 110 and the DVD drive 111, and stores the content in association with the content management information. The following describes the content and the content management information.

The Details of the Storage 1, Part 1: Content

The content is composed of a digital stream, map information and playlist information. The digital stream is a multiplexed stream obtained by multiplexing a video stream and an audio stream that are coded using a coding method such as MPEG 2 and MPEG4-AVC. The digital stream is called VOB in the DVD Video-Recording standard, and AV Clip in the Blu-ray Disc Rewritable standard.

The map information is information indicating the correspondence between address information of an access unit in the above-described video stream (here, access unit is referred to as a playback unit of a video stream that is independently decryptable) and playback time in the playback time-line of the video stream. The map information is called Time Map in the DVD Video-Recording standard, and EP_map in the Blu-ray Disc Rewritable standard.

The playlist information is information defining one or more playback sections by the combination of time information indicating a starting point and time information indicating an ending point.

Composed of the above-described pieces of information, the content is subjected to various kinds of editing, including partial deletion.

The Details of the Storage 1, Part 2: Content Management Information

The content management information is information for managing contents that exist in the HD drive 110 and the DVD drive 111. FIG. 5A shows the class structure of the content management information, and FIG. 5B shows type IDs in the content management information, authentication information, and the bit assignment of operation type information. According to FIG. 5A, the content management information includes content information and operation restriction information.

The Details of the Storage 1, Part 3: Content Information

"Content information" indicates a kind of the content with use of 'content ID' that is an 8-bit identifier and 'title' that is a character code string.

The Details of the Storage 1, Part 4: Operation Type Information

'Operation type information' indicates whether or not the operations of the content including editing, copying, and playing back are valid. The position of each of the partial bits in the operation type information corresponds to a different one of operations, and the value of each partial bit indicates whether or not the corresponding operation is valid. Specifically, the operation type information is 4-bit information as shown in the bit assignment in FIG. 5B, and composed of b[3], b[2], b[1], and b[0]. The b[0] corresponds to the operation for playback, the b[1] corresponds to the operation for copying, and the b[2] corresponds to the operation for editing. Suppose that an arbitrary bit selected among the b[0] to the b[3] is a bit[m]. When a value of the bit[m] is "1", the value indicates that the operation corresponding to the bit[m] is valid. When a value of the bit[m] is "0", the value indicates that the operation corresponding to the bit[m] is invalid.

The Details of the Storage 1, Part 5: Authentication Information

'Authentication information' indicates, for execution of each of the operations indicated either valid or invalid by the bit of the operation type information, whether or not authentication using the license information and the license management information is required. As shown in the bit assignment in FIG. 5B, when set to "1", the authentication information indicates that the authentication processing is required for execution of the operation. When set to "0", the authentication information indicates that the authentication processing is not required for execution of the operation.

The Details of the Storage 1, Part 6: Type ID

'Type ID' includes identifiers that indicate the types of the information ID, and indicates what type of information is to be used for authentication, which is performed for the execution of each of the operations indicated either valid or invalid by the bit of the operation type information. The type ID is an 8-bit value as shown in the bit assignment of FIG. 5B, and composed of b[7], b[6], b[5], b[4], b[3], b[2], b[1], and b[0]. The b[5] and b[4] correspond to an operation for editing (the operation indicated by b[2] in the operation type information). The b[3] and b[2] correspond to an operation for copying (the operation indicated by b[1] in the operation type information). The b[1] and b[0] correspond to an operation for playback (the operation indicated by b[0] in the operation type information). Here, suppose that an arbitrary bit selected among the b[0] to the b[5] is a partial bit b[m+1]b[m]. Then, the value of the partial bit b[m+1]b[m] indicates what type of information is used to decrypt the license information at the time of authentication for the execution of an operation corresponding to the partial bit. When set to "01", the value of the partial bit b[m+1]b[m] indicates the information ID required for authentication is "PIN code". When set to "10", the value of the partial bit b[m+1]b[m] indicates the information ID required for authentication is "Device ID of the recording/reproducing device". When set to "11", the value of the partial bit b[m+1]b[m] indicates the information ID required for authentication is "Organization code". When set to be "00", the value of the partial bit b[m+1]b[m] indicates that no information is used for authentication.

As described above, the content restriction information indicates what type of operations is valid with respect to the content. Also, when an operation is valid, the content restriction information specifically and individually indicates what type of information ID is required to decrypt the license information at the time of authentication for the execution of the operation.

FIG. 5C shows the instances of the content information and the operation restriction information. When the content shown on the second from top in FIG. 5C is taken as an example, the content ID, title, and operation type information of the content are respectively "00010111", "drama XX" and "0011". Since b[2] of the operation type information is "0", editing is not permitted. However, since b[1] of the operation type information is "1", copying is permitted. Furthermore, since b[1] of the authentication information is "1", authentication using the license information is required for copying. Also, b[0] of the operation type information is "1" and b[0] of the authentication information is "0", which means that authentication is not required for the playback of the content.

The type ID of the content is "00000100". In other words, b[3]b[2], which corresponds to b[1] of the operation type information, is "01". This "01" indicates that the PIN code is required for the authentication processing when copying the content.

Note that, in the descriptions of the content hereinafter, FIG. 5C is used as the specific example of the content unless otherwise noted. Also, the specific examples of figures provided hereinafter are based on the FIGS. 5A to 5C.

<Operation Execution Unit 2>

The operation execution unit 2 performs an operation for the content stored in the storage 1 when a user makes an operation request and the operation permission unit 4 gives permission to the execution of the operation. If the operation permission unit 4 does not give permission to the execution of the operation, the operation execution unit 2 does not execute the operation to the content stored in the storage 1. The operation is executed when the following system control is realized in the hardware configuration shown in FIG. 3.

The Details of the Operation Execution Unit 2, Part 1: The System Control when Recording a Content The following describes the system control when recording a content. Upon receiving a recording request from the user input circuit 104, the operation execution unit 2 instructs a drive device to write the content, and the encoder circuit 106 performs encoding processing on a broadcast signal. Then, coded data obtained by performing the encoding processing is written into free memory space of a DVD-RAM in the DVD drive 111. Also, the operation execution unit 2 extracts the content information from the broadcast signal, and generates a storage address and a content number. Then, the operation execution unit 2 sends the extracted content information, the storage address, and the content number to the drive device, which are then written into the DVD-RAM in the DVD drive 111 as the content management information. In a case where the content management information includes a copyright protection signal, the operation execution unit 2 acquires a media ID of the DVD-RAM in the DVD drive 111. Then, the operation execution unit 2 uses the media ID to encrypt the content and writes the encrypted content into the DVD-RAM in the DVD drive 111.

The Details of the Operation Execution Unit 2, Part 2: System Control when Playing Back a Content The following describes the system control of the operation execution unit 2 when playing back a content. Upon receiving a playback request from the user input circuit 104, the operation execution unit 2 instructs the drive device to read the content management information from the DVD-RAM in the DVD drive 111 to acquire the storage address of the content from the content management information. Based on the storage address, the operation execution unit 2 reads digital streams that constitute the content, and sends the digital streams to the decoder circuit 107. In a case where the content management information includes the copyright protection signal, the operation execution unit 2 acquires the media ID of the DVD-RAM in the DVD drive 111. Then, the operation execution unit 2 uses the media ID to decrypt the content, and then sends the decrypted content to the decoder circuit 107.

The Details of the Operation Execution Unit 2, Part 3: The System Control when Copying a Content The following describes the system control when copying the content. Upon receiving a copy request from the user input circuit 104, the operation execution unit 2 instructs the drive device to read the content management information from the HD drive 110, and acquires the storage address of the digital streams that constitute the content. Based on the storage address, the operation execution unit 2 reads the digital streams that constitute the content, which is a copy target, and then writes the digital streams into the free memory space of the DVD-RAM in the DVD drive 111. Subsequently, the operation execution unit 2 generates the storage address and the content number, and combines them with the content information to obtain new content management information. Finally, the operation execution unit 2 writes the new content management information into the DVD-RAM in the DVD drive 111. When the content information in the HD drive 110 includes copy control information, and the copy control information indicates Only One Copy, the operation execution unit 2 deletes the content from the HD drive 110 since copying is prohibited. This is to realize the movement of the content.

The above-described system control is basically the same as the control that is realized for the recording, playing back, and copying DVDs. Therefore, the detailed descriptions of the system control are omitted.

This concludes the descriptions of the operation execution unit 2.

<GUI Unit 3>

Figure 6:
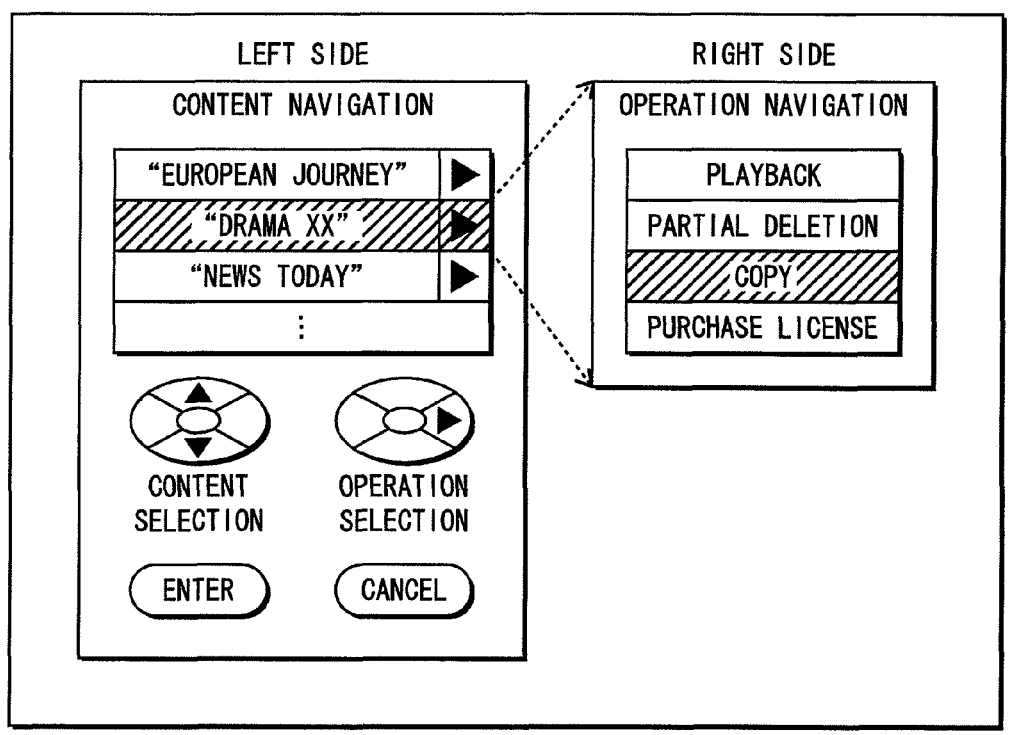
FIG. 6 is a diagram showing one example of content navigation and operation navigation.

The GUI unit 3 causes the OSD generator 108 to create OSD images, instructs the overlay circuit to overlay the OSD images so that various kinds of menu options are displayed, and receives, from a user, operation requests for the content via the menu options. The menu options displayed by the GUI unit 3 include content navigation and operation navigation. FIG. 6 shows one example of the content navigation and the operation navigation.

The Details of the GUI Unit 3, Part 1: Content Navigation

The left side of FIG. 6 shows the content navigation. The content navigation is a GUI component in which contents stored in the storage 1 has been visualized. Using the title character strings of the contents, the content navigation shows the existence of the contents. The content navigation, includes three types of state, namely "Normal State", "Focus State", and "Active State". "Normal State" is a state where the content is not a target of selection by a user. "Focus State" is a state where the content is selected to be a candidate of playback by the up/down arrow keys of the remote controller. "Active State" is a state where the content is confirmed as the target of playback. By changing the state of the content based on the operations performed on the remote controller, the selection of which content to be played can be made easily.

Meanwhile, it is the same as the normal menus on the point that "Enter button" for confirming the current selection and "Cancel button" for canceling the current selection are arranged at the bottom of the menu.

The Details of the GUI Unit 3, Part 2: Operation Navigation

The right side of FIG. 6 shows the operation navigation. The operation navigation is a menu that can be brought out from a content by pressing the right arrow key of the remote controller when the content is in the focus state. The menu displays a list of feasible operations for the content in the focus state. In FIG. 6, four types of operation including "Playback", "Partial deletion", "Copy" and "Purchase license" are displayed as an example. If an infeasible operation is included in the playback, partial deletion, and copy operations, the operation navigation grays out the operation on the display while showing the feasible operations as the normal states. By displaying the states of the operations as described above, infeasible operations can be easily known.

"License purchase" is an operation for a user to purchase a license when the operation requires authentication using "license information" in general operations for the content. Here, the general operations include playback, partial deletion, and copy. In other words, if the operations including playback, partial deletion, and copy are all feasible without authentication using "license information", "purchase operation" is not shown on the display. However, if any of the operations requires the authentication, "Purchase license" is shown on the display.

The Details of the GUI Unit 3, Part 3: Usage Range Menu

Figure 7:
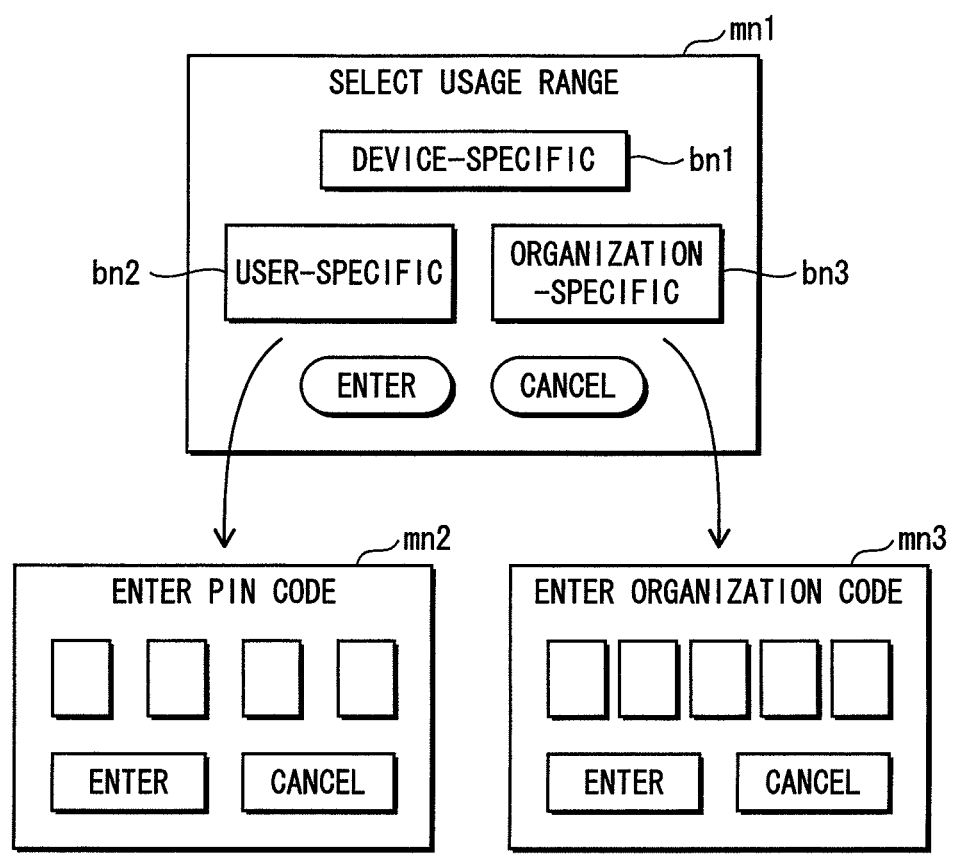
FIG. 7 is a diagram showing a usage range menu mn 1, PIN code entry menu mn 2, and system code entry menu mn 3.

In order to realize the purchase of the license, a usage range as shown in FIG. 2 is required to be specified by a user, and the specified usage range needs to be received by the GUI unit 3. FIG. 7 shows a usage range menu mn1, a PIN code entry menu mn2, and an organization code entry menu mn3. The usage range menu mn1 includes a device-specific button bn1 that receives a selection of setting the usage range of the content to be specific to the device, a device-specific button bn2 that receives a selection of setting the usage range of the content to be specific to the user, an organization specific button bn3 that receives a selection of setting the usage range of the content to be specific to the organization. Meanwhile, it is the same as the normal menus on the point that "Enter button" for confirming the current selection and "Cancel button" for canceling the current selection are arranged at the bottom of the menu.

The Details of the GUI Unit 3, Part 4: PIN Code Entry Menu

The PIN code entry menu mn 2 is a menu that is displayed as a sub menu when the selection of the user-specific button has been confirmed, and receives the input of a 4-digit value. Meanwhile, it is the same as the normal menus on the point that "Enter button" for confirming the current selection and "Cancel button" for canceling the current selection are arranged at the bottom of the menu.

The Details of the GUI Unit 3, Part 5: Organization Code Entry Menu

The organization code entry menu mn 3 is a menu that is displayed as a sub menu when the selection of the organization-specific button has been confirmed, and receives the input of a 5-digit value. Meanwhile, it is the same as the normal menus on the point that "Enter button" for confirming the current selection and "Cancel button" for canceling the current selection are arranged at the bottom of the menu. This concludes the descriptions of the GUI unit 3.

<Operation Permission Unit 4>

Upon receiving, from the GUI unit 3, a content selected via the content navigation and the type of operation required to be executed via the operation navigation, the operation permission unit 4 judges whether or not the required operation is permitted to be executed, by referring to the operation type information in the content management information of the selected content. If the operation is permitted to be executed, the operation permission unit 4 gives an operation permission to the operation execution unit 2. If the operation is not permitted to be executed, the operation permission unit 4 does not give the operation permission to the operation execution unit 2. This concludes the descriptions of the operation permission unit 4.

<Device ID Storage Unit 5>

The device ID storage unit 5 stores a device ID as the information ID that is unique to the recording/reproducing device.

<License Acquisition Information Generation Unit 6>

When a user has requested the operation of "Purchase License" via the operation navigation, the license acquisition information generation unit 6 generates the license acquisition information, and controls the writing unit 7 to write the generated license acquisition information onto the memory card 300.

The Details of the License Acquisition Information Generation Unit 6, Part 1: License Acquisition Information FIG. 8A shows the class structure of the license acquisition information The license acquisition information is composed of "Content information" that specifies a content uniquely, "Operation type information" that indicates the operation type corresponding to the content operation, and "Type ID" that indicates the type of information ID used for encryption of the acquired license information. Also, the license acquisition information may include "encrypted information ID" as an arbitrary component.

The "encrypted information ID" becomes the component of the license acquisition information when the information ID is the device ID or the organization code, and is generated either by encrypting the device ID using the PIN code, or by encrypting the organization code using the PIN code.

FIG. 8B shows the bit assignment of the license acquisition information. It can be seen that the bit assignment in this figure is the same as the assignment in FIG. 5B.

FIG. 8C is a diagram showing the instance of the license acquisition information used for a content operation performed on a desired content to be recorded onto the memory card 300. In the license acquisition information shown in FIG. 8C, the operation type information is set to "0010", and the type ID is set to "00001000". In the figure, b[1] of the operation type information is "1", and b[3]b[2] of the type ID is "10". Therefore, it can be known that information ID used to encrypt the license information when realizing the operation to copy the content is the device ID of the recording/reproducing device.

Figure 9:
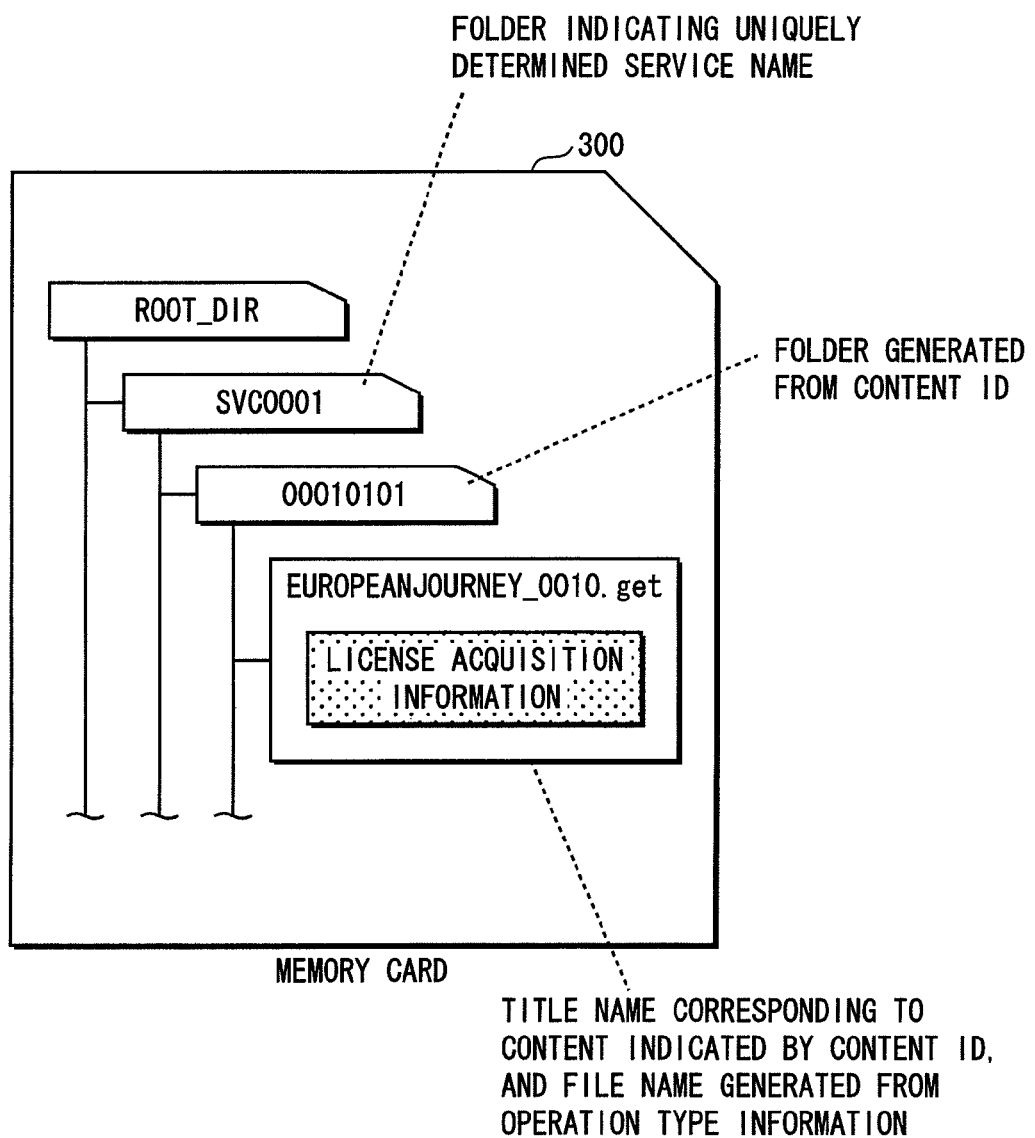
FIG. 9 is a diagram showing the location of the license acquisition information to be stored in the memory card 300.

FIG. 9 is a diagram showing the location of the license acquisition information to be stored in the memory card 300. As for this location, a path from a root is uniquely specified by the content information included in the license acquisition information, and a file name is uniquely specified by the combination of a title included in the license acquisition information and the operation type information.

In FIG. 9, the license acquisition information is stored in a given file, and arranged under a folder whose name is "00010101", which is the same name as the content ID. This file is given the file name "Europeanjourney_0010.get", which is created by the combination of the title "European journey" and the operation type information "0010". Note that the "SVC0001" folder in the figure exists as a folder that is uniquely determined by a service or a system.

In the structure of the license acquisition information described above, if the device ID or the organization code is used as the information ID, the "encrypted information ID" becomes a component of the license acquisition information. Therefore, the license acquisition information generation unit 6 displays the above-described PIN code entry menu, and receives the input of the PIN code via the menu, and further encrypts the device ID or the organization ID using the PIN code.

Figure 10:
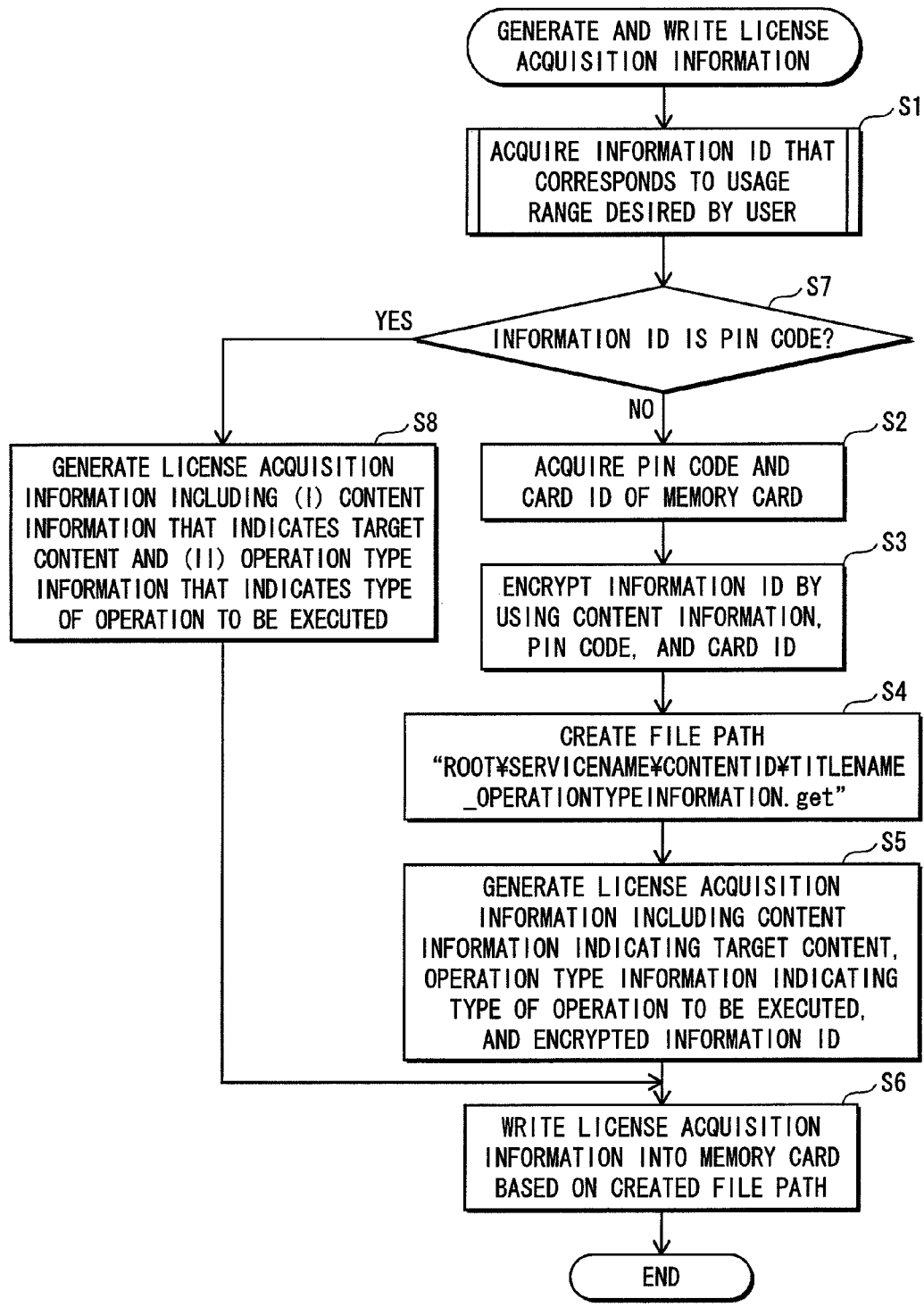
FIG. 10 is a flowchart showing the steps of the generating and writing processing of the license acquisition information.

The license acquisition information generation unit 6 that has the above-described structure can be implemented in the recording/reproducing device by writing the processing steps shown in FIG. 10 in a computer description language and causing the CPU to read the processing steps.

The Details of the License Acquisition Information Generation Unit 6, Part 2: Generating and Writing the License Acquisition Information FIG. 10 is a flowchart showing the steps of the generating and writing processing of the license acquisition information.

The processing, shown by the flowchart is performed when a user has executed an operation to request for the purchase of the license in the operation navigation. First, the license acquisition information generation unit 6 acquires the information ID corresponding to the usage range desired by a user (step S1). When the acquired information ID is the device ID or the organization code, the license acquisition information generation unit 6 uses the PIN code to encrypt the information ID. When encrypting the information ID, the license acquisition information generation unit 6 receives the input of the PIN code by displaying the PIN code entry menu, and also acquires the card ID of the memory card 300 (step S2). Then, the license acquisition information generation unit 6 generates an encryption key from the PIN code, the content information, and the card ID, and encrypts the information ID using the generated encryption key (step S3).

The concept of encryption of the information ID is to encrypt the license acquisition information so as to be dependent on 3 elements including (i) the content corresponding to this license acquisition information, (ii) the medium on which this license acquisition information has been recorded, and (iii) the PIN code that is known only by a user. Therefore, an encryption key for decryption is generated from (a) the content information that is unique to the content, (b) the card ID that is unique to the medium, and (c) the PIN code. The encryption key for decryption is generated with use of an encryption key that is a fixed-length bit string obtained by concatenating bit values (this operation is called "concatenation") that each indicate the content information, the card ID, and the PIN code respectively.

As for encryption, ECBC mode can be used for an encryption method. In the ECBC mode encryption, plain text is divided into the blocks of 64 bits or less, and then, encryption is performed for each of the divided blocks. When encrypting each divided block, the above-described encryption key is used for encryption of the first divided block. Then, the encryption result of the first divided block is used for encryption of the next divided block. The ECBC mode encryption is to sequentially encrypt each divided block using an encryption result of an immediately preceding divided block. Note that the decryption mode that reversely performs the same process is referred to as DCBC mode.

In the step S4 that follows, a file path is created in accordance with the generation rule Root¥servicename¥contentID¥titlename_operationtypeinformation. get. In step 5, the license acquisition information, which is composed of (i) the content management information of a target content, (ii) the operation type information indicating the type of operation to be executed, and (iii) the information ID that has been encrypted, is generated.

After the file path and the license acquisition information are generated in the above-described procedure, the license acquisition information is written into the memory card 300 based on the generated file path (step S6).

Figure 11:
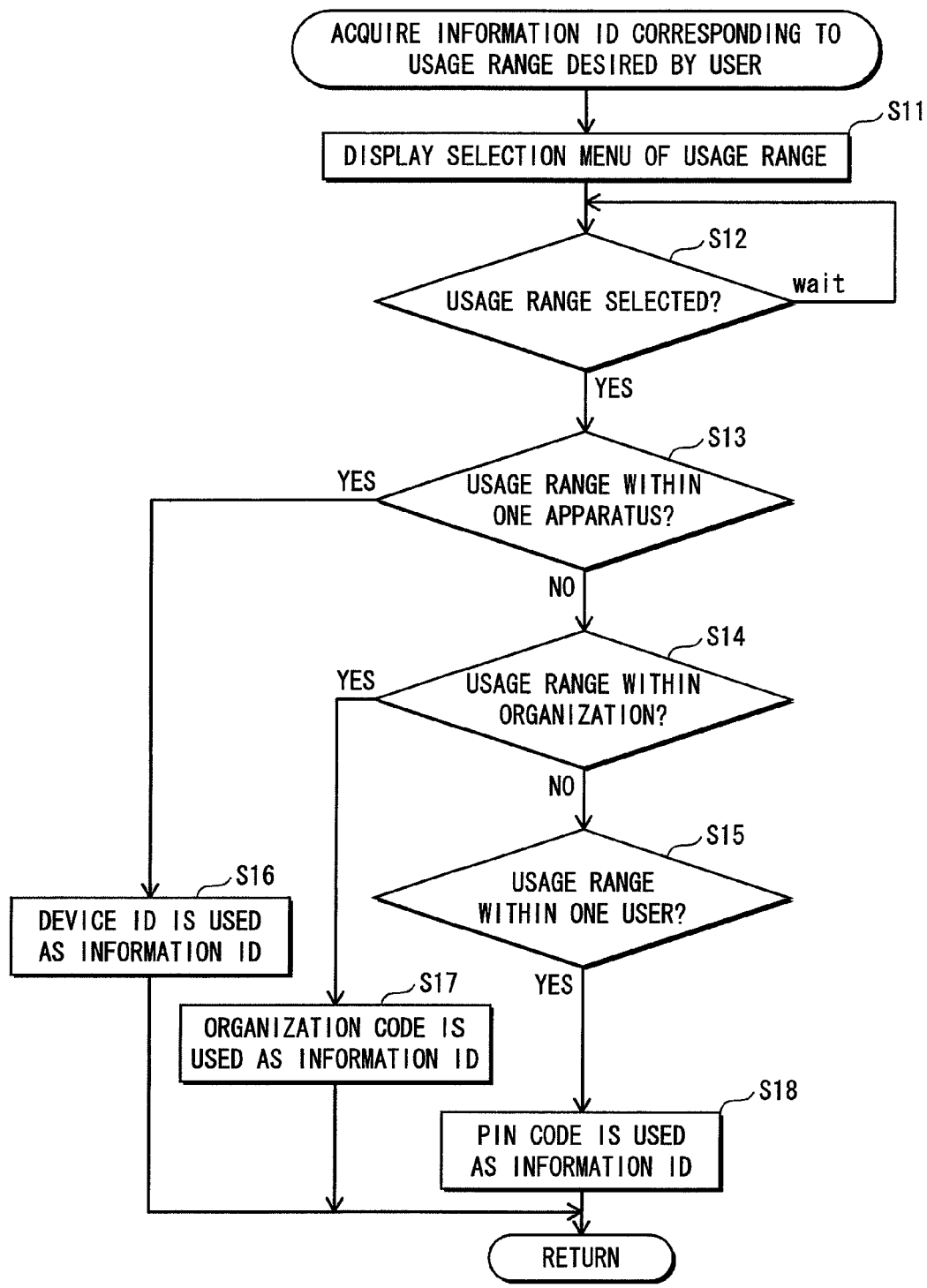
FIG. 11 is a sub-flowchart showing the details of the step S1.

FIG. 11 is a sub-flowchart showing the details of the step S1. In step S11, the usage range menu is displayed, and step S12 describes a waiting state for the selection of a usage range. When a usage range is selected, the processing advances to a judgment step consisting of steps S13 to S15.

In step S13, judgement is performed to determine whether or not the usage range is within only one apparatus. If the usage range is within one apparatus, the device ID is used as the information ID (step S16). In step S14, judgement is performed to determine whether or not the usage range is within an organization to which one user belongs. If the usage range is within the organization, the organization code is used as the information ID (step S17). In step S15, judgment is performed to determine whether or not the usage range is within all of the devices that are permitted to be used by a user. If the usage range is within the all of the devices that are permitted to be used by the user, the PIN code is used as the information ID (step S18).

(Specific Example)

The following describes the content of the processing shown in the flowcharts of FIG. 10 and FIG. 11, with a specific example. A subject that is described here is a case where a content is copied from the HD drive 110 onto the DVD drive 111, and for a target for copying, the content having the content ID "00010101", and the title "European journey" is selected.

The operation type information of the content is "0111" and the b[1] of the content is "1". Therefore, it is judged that the content is permitted to be copied. Meanwhile, the authentication information is "0010", the type ID is "00001000" and the b[1] of the authentication information is "1". Therefore, the license information is required for copying and the content is a target of a license purchase.

Since the content is a target of a license purchase, the license acquisition information generation unit 6 displays the usage range menu (step S11 in FIG. 11) to receive the selection of the usage range. If the received usage range is within one recording/reproducing device, the device ID is used as the information ID (step S16 in FIG. 11).

Subsequently, the license acquisition information generation unit 6 acquires a PIN code by displaying an entry screen to encourage a user to enter the PIN code, generates an encryption key from (i) the content information, (ii) the card ID of the memory card, and (iii) the PIN code, and then encrypts the device ID, which is the information ID, of the recording/reproducing device (step S3 of FIG. 10).

In step S4 of FIG. 10, assume that the folder "SVC0001", which is determined uniquely by the service, exists immediately below the root, and a folder having the same name as the content ID "00010101" exists under the folder. Then, a file having the file name "europeanjourney_0010.get", which is named with use of the title "European journey" and the operation type information "0010" that corresponds to the content operation of copying, is created under the folder. Then, in step S6, the license acquisition information is written into the memory card 300 based on the file path "ROOT_DIR/SVC0001/00010101/europeanjourney_0010.get" that specifies the file "europeanjourney_0010.get".

This concludes the descriptions of the license acquisition information generation unit 6.

<Writing Unit 7>

The writing unit 7 is a functional component that is included in the card drive 112, and writes, onto the memory card 300, the license acquisition information that has been generated by the license acquisition information generation unit 6.

<Reading Unit 8>

The reading unit 8 is, as is the case with the writing unit 7, a functional component that is included in the card drive 112, and reads, form the memory card 300, the encrypted license information and the license management information, and provides the information to the decryption unit 9. This license information and the license management information are downloaded by the portable communication device 200 based on the license acquisition information recorded on the memory card 300, thereby being written onto the memory card 300. FIG. 12A is a diagram showing the class structures of the license information and the license management information, which are for a content operation performed for a desired content to be recorded onto the memory card 300.

The Details of the Reading Unit 8, Part 1: License Management Information

The license management information includes "Content information" that specifies a content uniquely, "Operation type information" that indicates the type of operation performed on the content such as copying and playing back the content, and "Type ID" that indicates the type of information ID used for encryption of the license information. The license management information is provided the type ID. Therefore, the information ID corresponding to a purpose of use can be used for the encryption of the license information.

The Details of the Reading Unit 8, Part 2: License Information

The license information is paired with the license management information, and indicates whether or not the content operations such as copying, playing back, and editing are permitted to be performed.

The license information is composed of "Content information" that uniquely specifies the content, "Operation type information", and "Issuer information" indicating the issuer of the license, and is encrypted using the information ID that corresponds to the type ID indicated by the license management information.

FIG. 12B is a diagram showing the instances of the license information and the license management information for a content operation performed on a desired content to be recorded onto the memory card 300.

The first instance of the license management information shown in FIG. 12B corresponds to the title "European journey" whose content ID is "00010101". The operation type information of the license management information is "0010". Therefore, it can be known that this license management information is the license information for the copy operation. Also, the type ID is "00001000", namely the bits b[3]b[2] that correspond to the bit b[1] of the operation type information is "10". Therefore, it can be known that the license information is encrypted using the device ID of the recording/reproducing device.

The second instance of the license management information shown in this figure corresponds to the title "drama XX"

whose content ID is "00010111". The operation type information of the license management information is "0010". Therefore, it can be known that this license management information is the license information for the copy operation. Also, the type ID is "00000100", namely the bits b[3]b[2] that correspond to the bit b[1] of the operation type information is "01". Therefore, it can be known that the license information is encrypted using the PIN code of the recording/reproducing device. FIG. 12C is a diagram showing one example of the encrypted license information. Also, FIG. 12D is a diagram showing the bit assignment of the license information and the license management information. The bit assignment in FIG. 12D is the same as the bit assignment shown in FIG. 5B, and the example shown in FIG. 12C is license information encrypted based on the bit assignment.

Figure 13:
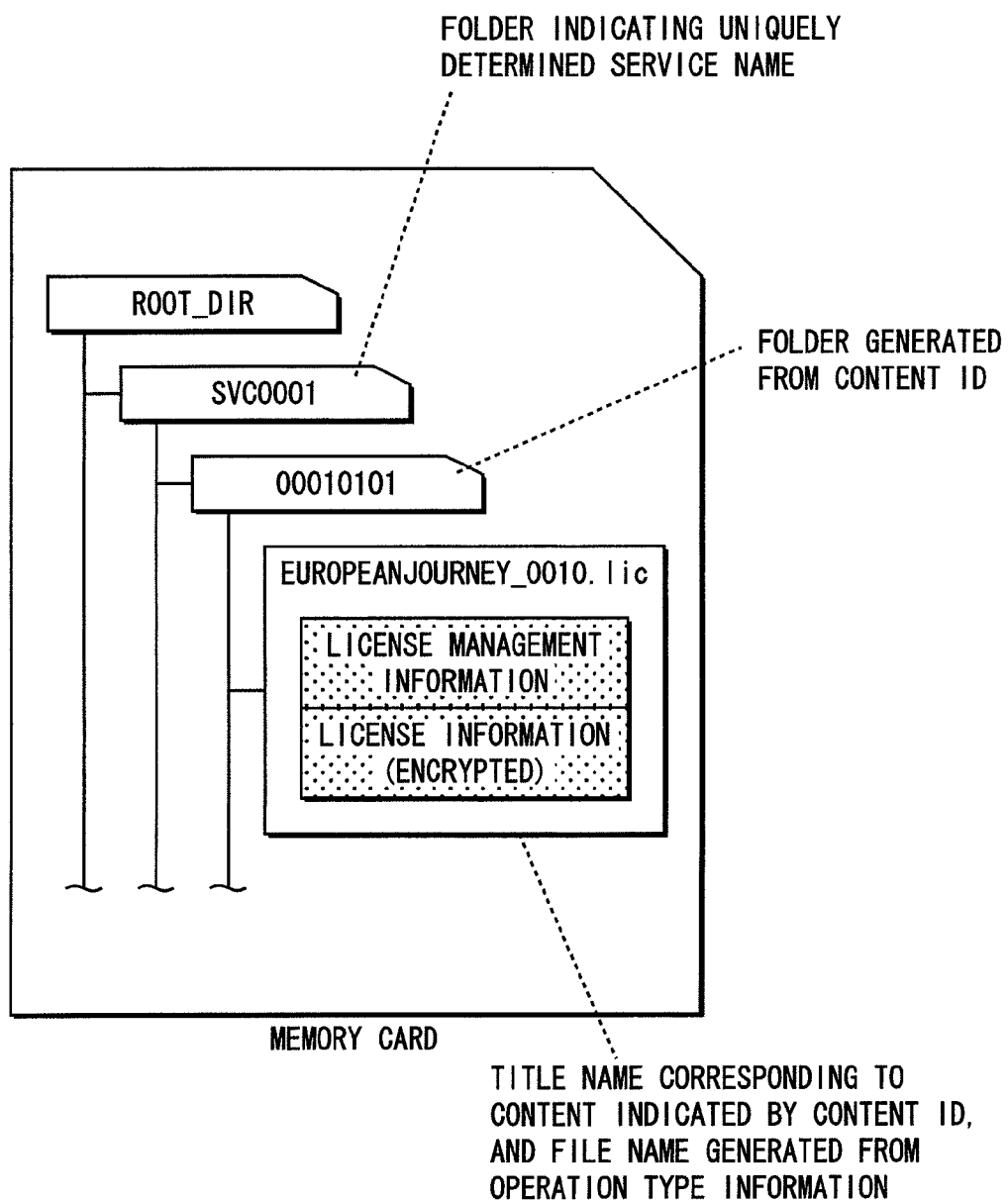
FIG. 13 is a diagram showing the location of the license management information in the memory card 300.

FIG. 13 is a diagram showing the location of the license management information in the memory card 300. The location is specified by a file path. As for this file path, the path from the root is uniquely determined by the content information included in the license management information, and the filename is uniquely determined by the title included in the license management information and the operation type information.

In FIG. 13, the license management information is stored in a file and arranged under a folder whose name is the same as the content ID "00010101". This file is given the file name "Europeanjourney_0010.lic", which is created by the combination of the title "European journey" and the operation type information "0010". Note that the "SVC0001" folder exists as a folder that is uniquely determined by a service or a system.

According to the file path shown in FIG. 13, the reading unit 8 realizes the reading of the license information and the license management information. This concludes the descriptions of the writing unit 7 and the reading unit 8.

<Decryption Unit 9>

The decryption unit 9 acquires the license information in plain text by decrypting the license information that has been encrypted. For this decryption, the decryption unit 9 uses, to decrypt the encrypted license information, a type of information ID indicated by the type ID in the license management information. If the information ID indicated by the type ID in the license management information is the device ID, the decryption unit 9 retrieves the device ID from the device ID storage unit 5 to use the device ID for the decryption.

If the information ID indicated by the type ID in the license management information is the PIN code, the decryption unit 9 causes the GUI unit 3 to display the PIN code entry menu. Then, from an input operation performed on the menu, the decryption unit 9 acquires the PIN code, and uses the PIN code as the information ID for the decryption.

If the information ID indicated by the type ID in the license management information is the organization code, the decryption unit 9 causes the GUI unit 3 to display the organization code entry menu. Then, from an input operation performed on the menu, the decryption unit 9 acquires the organization code, and uses the organization code as the information ID for the decryption.

In principle, the decryption of the license information using the information ID is performed under the same concept as encryption of the above-described license acquisition information. In other words, the license information is encrypted so as to be dependent on 3 elements including (i) the content corresponding to this license information, (ii) the medium on which this license information has been recorded, and (iii) the information ID acquired by using the above-described method. Therefore, the decryption is performed such that an encryption key for decryption is generated from 3 elements including (a) the content information that is unique to the content, (b) the card ID that is unique to the medium, and (c) the information ID. Then, the license information is decrypted using this generated encryption key. The encryption key generated here is a fixed-length bit string obtained by concatenating bit values that each indicate the content information, the card ID, and the information ID respectively. Hereinafter, "decryption using the information ID" refers to the decryption using an encryption key that is generated from, in addition to this information ID, the three elements, namely the information ID, the content information, and the card ID.

<Authentication Unit 10>

The authentication unit 10 is a component of the operation execution unit 2, and executes authentication by judging whether or not the license information in plain text and the license management information correspond to each other.

Figure 14:
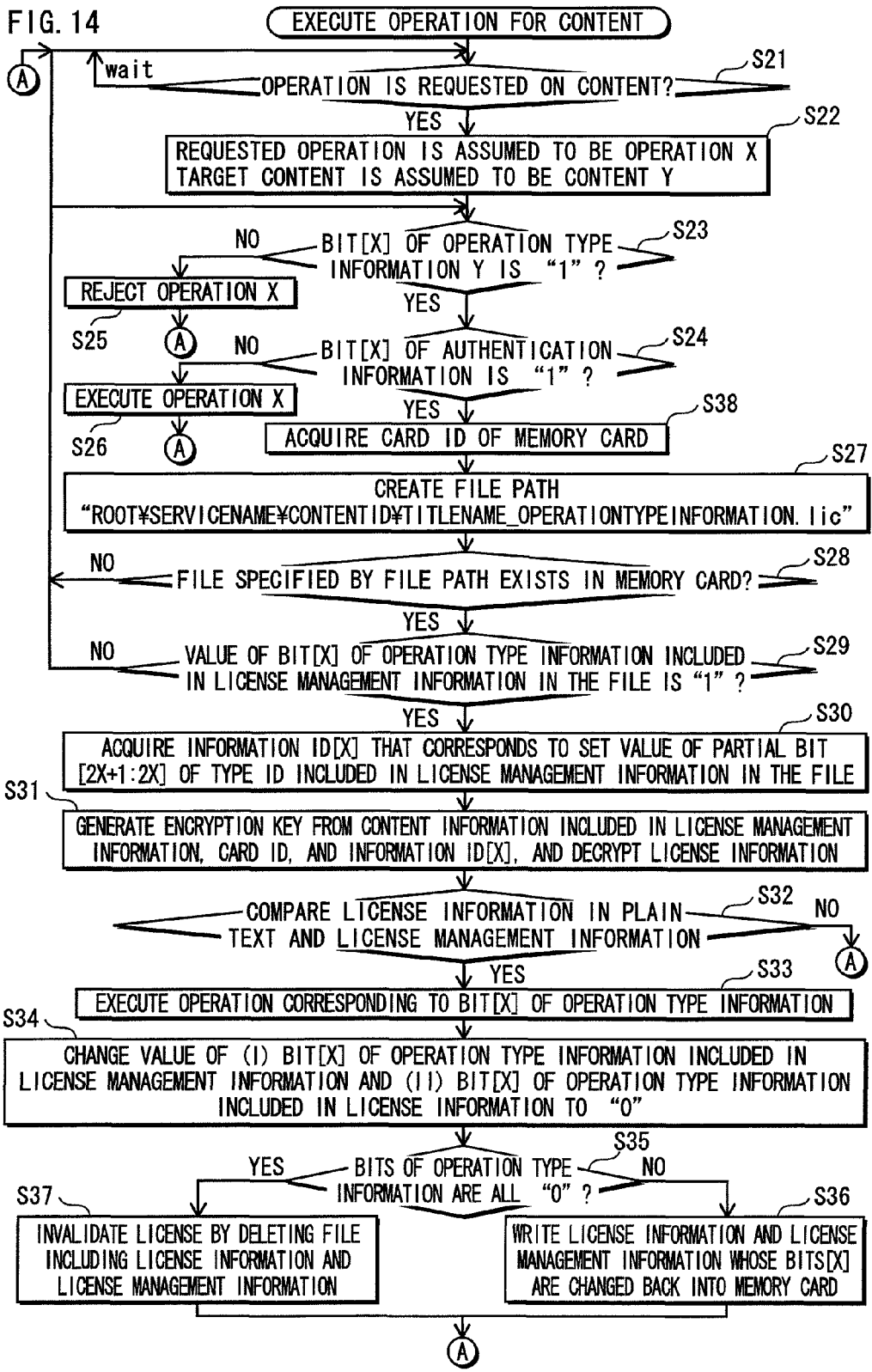
FIG. 14 is a flowchart showing the steps of the processing of an operation execution unit 2 and an authentication unit 10.

The operation execution unit 2 and the authentication unit 10 that have the above-described structure can be implemented in the recording/reproducing device by writing the processing steps shown in the flowchart of FIG. 14 in a computer description language and causing the CPU to read the processing steps. The following describes the processing steps shown in the flowchart of FIG. 14.

In step S21 of FIG. 14, an event waiting loop to wait for an operation request for a content is formed. When an operation is requested, the requested operation is assumed to be operation X and a target content is assumed to be content Y (step S22), and then the processing advances to a judgment step line in steps S23 and S24. In step S23, the authentication unit 10 judges whether or not a bit[x] of a bit string is "1". The bit string represents the operation type information of the content management information corresponding to the content Y. If the bit[x] of the bit string is "1", the authentication unit 10 rejects the operation X (step S25).

In step S24, the authentication unit 10 judges whether or not a bit[x] of authentication information Y included in the content management information that corresponds to the content Y is "1". If the bit[x] of the authentication information Y is not "1", the authentication unit 10 executes the operation X (step S26).

If the bit[x] of the authentication information Y is "1", the processing of step S38 and steps S27 to S37 is executed. First, the card ID of the memory card 300 is acquired (step S38). In step S27, a file path is created in accordance with the generation rule Root¥servicename¥contentID¥titlename_operationtypeinformation.lic. In step 28, the authentication unit 10 judges whether or not a file, which is the file path, exists in the memory card.

If the file exists therein, the authentication unit 10 judges whether or not the value of bit[x] of the operation type information included in the license management information of the file is "1" (step S29). If the value of the bit[x] is not "1", the processing returns to step S21. If the value of the bit[x] is "1", the authentication unit 10 acquires the information ID[x] that corresponds to a set value of a partial bit[2x+1:2x] of the type ID included in the license management information in the file (step S30), and decrypts the license information using the information ID[x]. Specifically, the authentication unit 10 generates an encryption key from the content information included in the license management information, the card ID, and the information ID[x], decrypts the license information using this encryption key (step S31), and then advances to step S32.

Step S32 is a step that compares the license information in plain text with the license management information. If the license information in plain text does not match with the license management information, the processing moves to step S21. If the two pieces of information match with each other, the processing advances to the steps S33 to S36.

In the processing steps S33 to S36, an operation corresponding to bit[x] of the operation type information is executed (step S33). Then, the value of bit[x] of the operation type information in the license management information, and the value of bit[x] of the operation type information in the license information are changed to "0" (step S34).

In step S35, the authentication unit 10 judges whether or not all of the bits that constitute the operation type information are set to "0". If not all of the bits are "0", the authentication unit 10 writes the license information and the license management information whose bits[x] are changed back onto the memory card 300 (step S36). If all of the bits are "0", the authentication unit 10 deletes the file that includes the license information and the license management information to invalidate the license (step S37)

(Specific Example)

The following describes the processing of the flowchart shown in FIG. 14, with a specific example. Here, it is assumed that the specific example shows a case where the content is copied from the HD drive 110 onto the DVD-RAM in the DVD drive 111. As a copy target, the content having the content ID "00010111" and the title "drama xx" is selected from the contents shown in FIG. 5.

In step S23, the operation type information of the content is "0011" and the b[1] of the content is "1". Therefore, the content is judged to be permitted to be copied. In step S24, the authentication information of the content is "0010", and the b[1] of the content is "1". Therefore, the content is judged that the authentication using the license information is required for copying.

In step S30, the type ID of the license management information "00000100" is acquired, and the bits b[3]b[2] that correspond to b[1] of the operation type information are "01". Therefore, the authentication unit 10 judges that the PIN code as the information ID is required for the authentication. Then, the authentication unit 10 displays the entry screen to encourage a user to enter the PIN code and acquires the PIN code. In step S31, the authentication unit 10 generates an encryption key from the content information, the card ID of the memory card, and the PIN code, and decrypts the license information using the generated encryption key.

In step 32, the content information and the operation type information that are included in the license management information are compared with the content information and the operation type information that are included in the decrypted license information to judge whether or not they are consistent. If they are judged to be consistent with each other, the authentication unit 10 executes the copy processing described in step S33, and then, in step S34, clears the b[1] of the operation type information that corresponds to the content operation included in the license management information, and clears b[1] of the operation type information that corresponds to the content operation included in the plain text license information that has been decrypted. Since the operation type information "0010" is set to "0000", the license information is judged to be unnecessary in step S35. In step S37, the authentication unit 10 deletes the license management information from the memory card. If not all the bits of the operation type information are cleared ("No" in step S35), the authentication unit 10 uses the encryption key used for decryption to re-encrypt the plain text license information whose information content has been changed, and then writes the license management information whose information content has been changed and the encrypted license information back in their respective original storage locations (step S36), and thereby invalidates the license information corresponding to the content operation and completes the processing.

Figure 15:
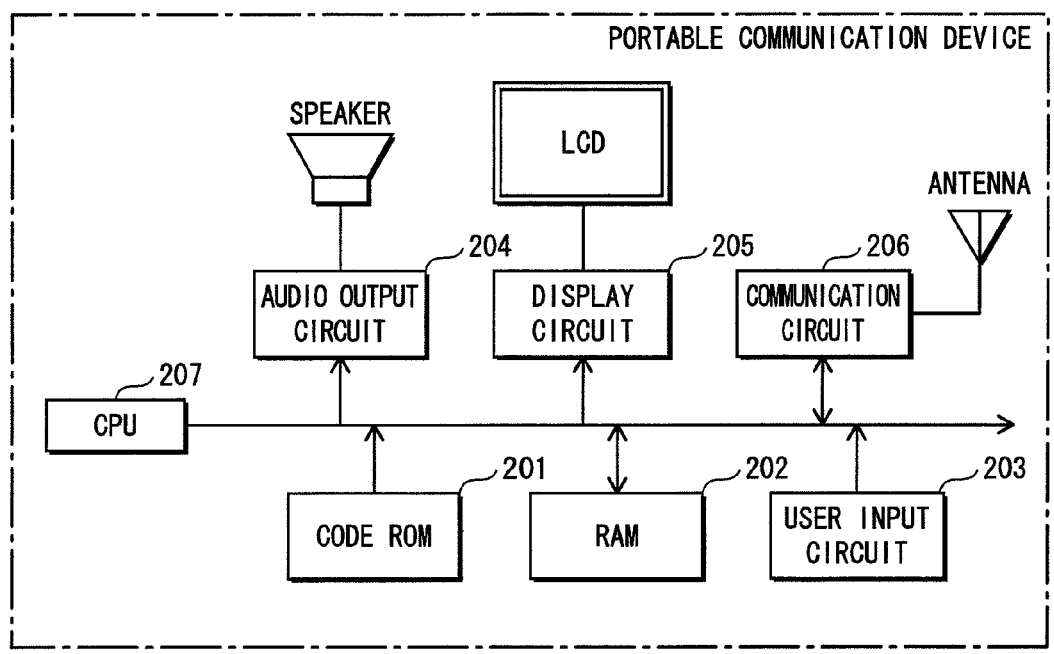
FIG. 15 is a diagram showing the hardware configuration of the portable communication device.
Figure 16:
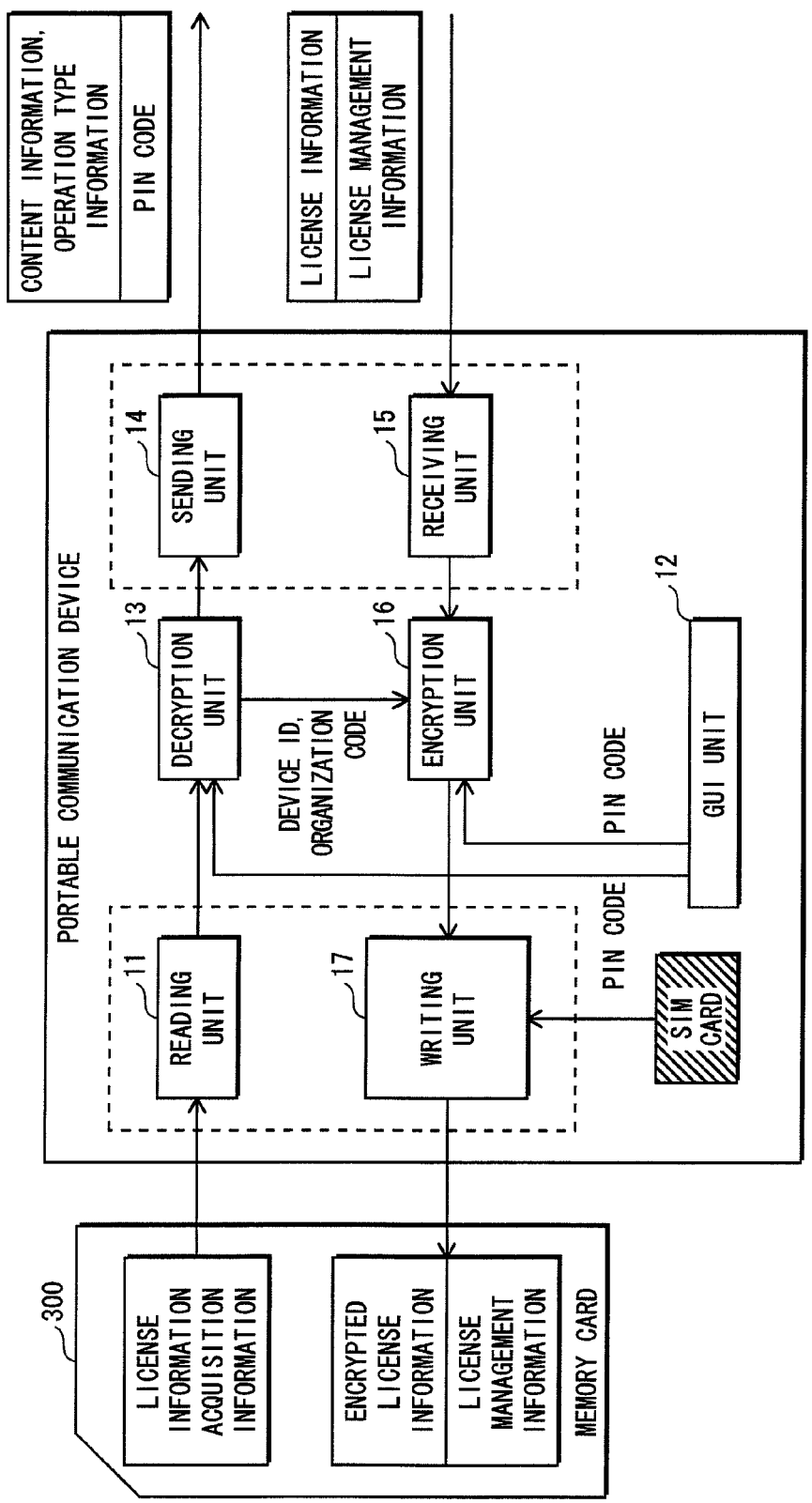
FIG. 16 is a block diagram functionally showing the internal structure of the portable communication device.

This concludes the descriptions of the recording/reproducing device. The following are the descriptions of the portable communication devices. The portable communication devices 200a and 200b shown in FIG. 1 share a common internal structure, which is shown in FIG. 15 and FIG. 16. The following describes the common internal structure of the portable communication devices 200a and 200b (hereinafter referred to as the internal structure of the portable communication device 200), with reference to the FIGS. 15 and 16.

FIG. 15 is a diagram showing the hardware configuration of the portable communication device. In a program of the present invention described in the present application, the hardware resource shown in FIG. 15 is used to realize the data processing.

As shown in FIG. 15, the hardware configuration of the portable communication device includes a ROM 201, a RAM 202, a user input circuit 203, an audio output circuit 204, a display circuit 205, a communication circuit 206, and a CPU 207.

The ROM 201 stores a software program for providing a service pertaining to the present invention.

The RAM 202 stores data to be written and corrected due to the program execution by the portable communication device 200.

The user input circuit 203 receives the input of keys connected thereto.

The audio output circuit 204 outputs audio via a speaker.

The display circuit 205 outputs images via an LCD.

The communication circuit 206 communicates via an antenna 1408 that is connected thereto to send and receive data necessary for the service.

The CPU 207 executes the program stored in the ROM 201. This concludes the hardware configuration of the portable communication device.

The portable communication device 200 accesses a content server that manages the content information, and acquires the content and the license management information corresponding to an operation. FIG. 16 is a block diagram that functionally shows the internal structure of the portable communication device 200 for realizing the above-described functions. As shown in FIG. 16, the portable communication device is composed of a reading unit 11, a GUI unit 12, a decryption unit 13, a sending unit 14, a receiving unit 15, an encryption unit 16, and a writing unit 17.

<Reading Unit 11>

The reading unit 11 creates a file path that uniquely specifies the location of the license acquisition information. Then, according to the file path, the reading unit 11 reads the license acquisition information from the memory card 300. When creating the file path, the reading unit 11 determines a path from a root, based on the content information included in the license management information, and also determines a file name from the combination of the content information and the operation type information.

<GUI Unit 12>

GUI unit 12 displays the PIN code entry menu and a webpage of the license server 400.

<Decryption Unit 13>

When the encrypted information ID exists in the license acquisition information, the decryption unit 13 decrypts the encrypted information ID by using the information ID indicated by the operation type information in the license acquisition information. With this decryption, the decryption unit 13 obtains the information IDs such as the device ID and the organization ID.

In principle, the decryption of the license acquisition information using the information ID is performed under the same concept as encryption of the above-described license acquisition information. In other words, the license acquisition information is encrypted so as to be dependent on 3 elements including (i) the content corresponding to this license acquisition information, (ii) the medium on which this license information has been recorded, and (iii) the PIN code that is known by only a user. Therefore, the decryption is performed such that an encryption key for decryption is generated from (a) the content information that is unique to the content, (b) the card ID that is unique to the medium, and (c) the PIN code, and the license acquisition information is decrypted using this encryption key.

<Sending Unit 14>

The sending unit 14 makes a request to the license server 400 for acquiring the license. This acquisition request is realized such that the sending unit 14 accesses the license server 400 and sends, to the license server 400, a combination of the content management information included in the license acquisition information, the operation type information and the PIN code of a user, as the acquisition request.

<Receiving Unit 15>

The receiving unit 15 receives, from the license server 400, the license information and the license management information that correspond to the acquisition request. It is preferable that the sending and receiving of the license information and the license management information is performed with use of SSL (Secure Socket Layer). The SSL-compatible license server 400 has a digital certificate preinstalled therein. Upon receiving an SSL request from the receiving unit 15, the license server 400 sends the digital certificate to the receiving unit 15. This digital certificate is generated by encrypting a public key, and the receiving unit 15 authenticates the digital certificate. If having obtained a legitimate public key by the authentication, the receiving unit 15 judges that this license server 400 is reliable. Then, the receiving unit 15 sends a common key that has been encrypted using the public key. The license server 400 decrypts, by using a secret key, the encrypted common key that has been sent, and shares the common key with the receiving unit 15. With this common key that has been shared in the above-described manner, the receiving unit 15 sends and receives the license information and the license management information. The reason why the common key is used for sending and receiving the license information and the license management information is to perform the encryption processing at high speed. Also, for the sending and receiving of this data, HTTP, mail, FTP, or Telnet is adopted.

<Encryption Unit 16>

Upon receiving the combination of the license management information and the license information, the encryption unit 16 encrypts the license information using the information ID that is indicated by the type ID of the license management information.

In principle, encryption of the license information using the information ID is performed under the same concept as encryption of the above-described license acquisition information. In other words, the license information should be encrypted so as to be dependent on 3 elements including (i) the content corresponding to this license information, (ii) the medium on which this license information has been recorded, and (iii) the information ID acquired by using the above-described method. Therefore, the encryption is performed such that an encryption key for encryption is generated from (a) the content information that is unique to the content, (b) the card ID that is unique to the medium, and (c) the information ID, and the license information is encrypted using this encryption key. The encryption key generated here is a fixed-length bit string obtained by concatenating bit values (this operation is called "concatenation") that each indicate the content information, the card ID, and the information ID respectively. Hereinafter, "encryption using the information ID" refers to the encryption using an encryption key that is generated from, in addition to this information ID, the three elements, namely the information ID, the content information, and the card ID.

<Writing Unit 17>

The writing unit 17 creates a file path that uniquely specifies the location of the license information and the license management information. Then, according to the file path, the writing unit 17 writes the license information and the license management information onto the memory card 300. When creating the file path, the writing unit 17 determines the path from a root, based on the content information included in the license management information, and also determines a file name from the combination of the content information and the operation type information.

Figure 17:
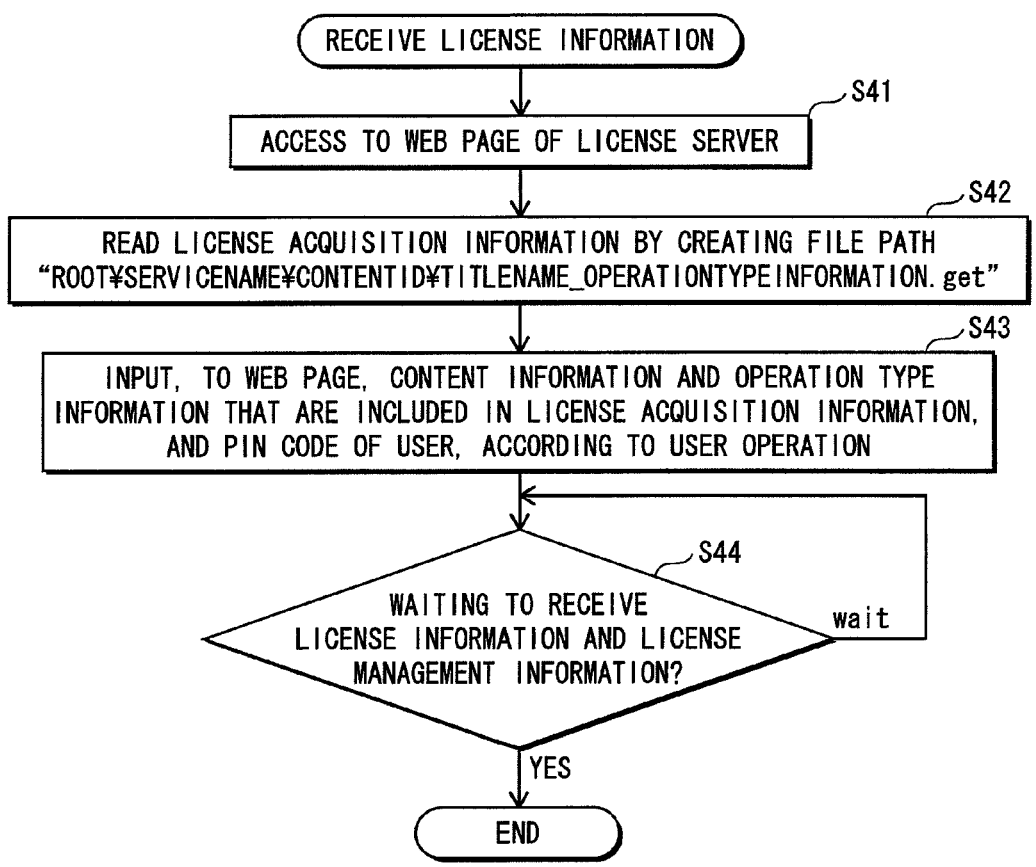
FIG. 17 is a flowchart showing the steps of receiving the license information.

The receiving unit 15 that has the above-described structure can be implemented in the recording/reproducing device by writing the processing steps shown in FIG. 17 in a computer description language and causing the CPU to execute the processing steps.

FIG. 17 is a flowchart showing the steps of receiving the license information. First, in step S41, the receiving unit 15 accesses the webpage of the license server. In step S42, the receiving unit 15 creates a file path in accordance with the generation rule Root¥servicename¥contentID¥titlename_operationtypeinformation.get, and reads the license acquisition information in accordance with the file path. Then, in step S43, the receiving unit 15 inputs, to the webpage, the content information and the operation type information that are included in the license acquisition information, and the PIN code, according to the user operation. In step S44, a receive waiting loop is formed to wait to receive, from the license server, the license information and the license management information. When having received the license information and the license management information, the receiving unit 15 ends the processing of the flowchart in FIG. 17.

The writing unit 17 that has the above-described structure can be implemented in the recording/reproducing device by writing the processing steps shown in FIG. 18 in a computer description language and causing the CPU to execute the processing steps.

FIG. 18 is a flowchart showing the steps of the processing performed by the writing unit 17.

Step S51 is a judging step that judges whether or not it is necessary to acquire the information ID with use of the license acquisition information. If not necessary to refer to the license acquisition information, the writing unit 17 acquires the card ID of the memory card 300 (step S52), and also acquires the PIN code as the information ID according to the type ID (step S53). If necessary to refer to the license acquisition information, the writing unit 17 creates a file path according to the generation rule Root¥servicename¥contentID¥titlename_operationtypeinformation.get (step S54), and reads the license acquisition information according to the file path. Meanwhile, the writing unit 17 acquires the PIN code via the GUI, and also acquires the card ID of the memory card 300 (step S55). With the PIN code acquired by the above-described procedure, the writing unit 17 decrypts the information ID in the license acquisition information. Specifically, an encryption key is generated from the PIN code and the card ID, and then the information ID is decrypted using the generated encryption key (step S56).

In step S57 that follows, an encryption key is generated using the content management information, the card ID, and the information ID, which is then used to encrypt the license information. In step S58, the writing unit 17 judges whether or not the information ID used for the encryption is the same information ID as the one indicated by the license management information. If the information ID is not the same as the one indicated by the license management information, the writing unit 17 updates the type ID so as to cause the type ID of the license management information to indicate the type of information ID used for the encryption (step S59), and then moves on to step S60. If the information ID is the same as the one indicated by the license management information, the writing unit 17 skips step S59 and proceeds to step S60. After that, the writing unit 17 creates a file path according to the generation rule Root¥servicename¥contentID¥titlename_operationtypeinformation.lic (step S60), and encrypts the license information according to the file path. Finally, the writing unit 17 writes the encrypted license information together with the license management information to the memory card 300 (step S61).

(Specific Example)

The following describes the processing shown in the flowchart of FIG. 18, with a specific example. A subject that is described here is a case where a content is copied from the HD drive 110 onto the DVD drive 111, and for a target for copying, the content having the content ID "00010101", and the title "European journey" is selected.

As for the content, the type ID in the license management information is "00001000" and the bits b[3], b[2] that correspond to the b[1] of the operation type information are "10". Therefore, in step S51, the writing unit 17 judges that the device ID of the recording/reproducing device is required as the information ID used for encryption of the license information, and that the device ID of the recording/reproducing device is the information ID that is impossible to be acquired by the communication device.

According to the file layout of the memory card 300, the folder "SVC0001", which is determined uniquely by a service, exists immediately below the root, and a folder having the same name as the content ID "00010101" exists under the folder. Then, a file having the file name "europeanjourney_0010.get", which is named with use of the title "European journey" and the operation type information "0010" that corresponds to the content operation of copying, exists under the folder. Therefore, in step S54, the writing unit 17 creates the file path of the license acquisition information "ROOT_DIR/SVC0001/00010101/europeanjourney_0010.get".

In step S55, the writing unit 17 acquires the card ID from the memory card 300, and the PIN code by displaying an entry screen that encourages a user to enter the PIN code. In step 56, an encryption key is generated from the content information, the card ID of the memory card, and the PIN code, and the device ID that is the information ID is decrypted with use of the encryption key, so that the device ID can be obtained.

In step S57, an encryption key is generated from the content information, the card ID of the memory card. Then, the decrypted information ID. Then, the license information is encrypted with use of the generated encryption key, Meanwhile, in the memory card 300, the folder "SVC0001", which is determined uniquely by the service, exists immediately below the root. Furthermore, a folder having the same name as the content ID "00010101" exists under the folder. Then, a file having the file name "europeanjourney_0010.get", which is named with use of the title "European journey" and the operation type information "0010", exists under the folder. Therefore, in step S60, the writing unit 17 creates the file path of the license management information "ROOT_DIR/SVC0001/00010101/europeanjourney_0010.lic". Finally, in step S61, the writing unit 17 writes the license management information to the memory card 300, based on the file path that has been created.

This concludes the detailed description of the processing shown in FIG. 18.

The following describes the processing of the recording/reproducing device and the communication device when executing a copy operation.

FIGS. 19 to 20 are the diagrams that schematically describe the process of supplying the license acquisition information to the communication device.

FIG. 19A is a diagram showing a stage where a user has requested a copy operation for the content "European journey". The arrow yr1 in the figure represents the request of the copy operation.

FIG. 19B is a diagram showing a stage where the operation execution unit 2 has referred to the operation type information and the authentication information in the content management information. The arrow yr2 in the figure represents the state where the operation execution unit 2 is referring to the authentication information. The bit assignment of the content "European journey" is shown in FIG. 5B. According to the authentication information of FIG. 5B, the copy operation is set to "authentication required". Therefore, the license acquisition information generation unit 6 generates the license acquisition information at the stage of FIG. 19B.

Figure 20A:
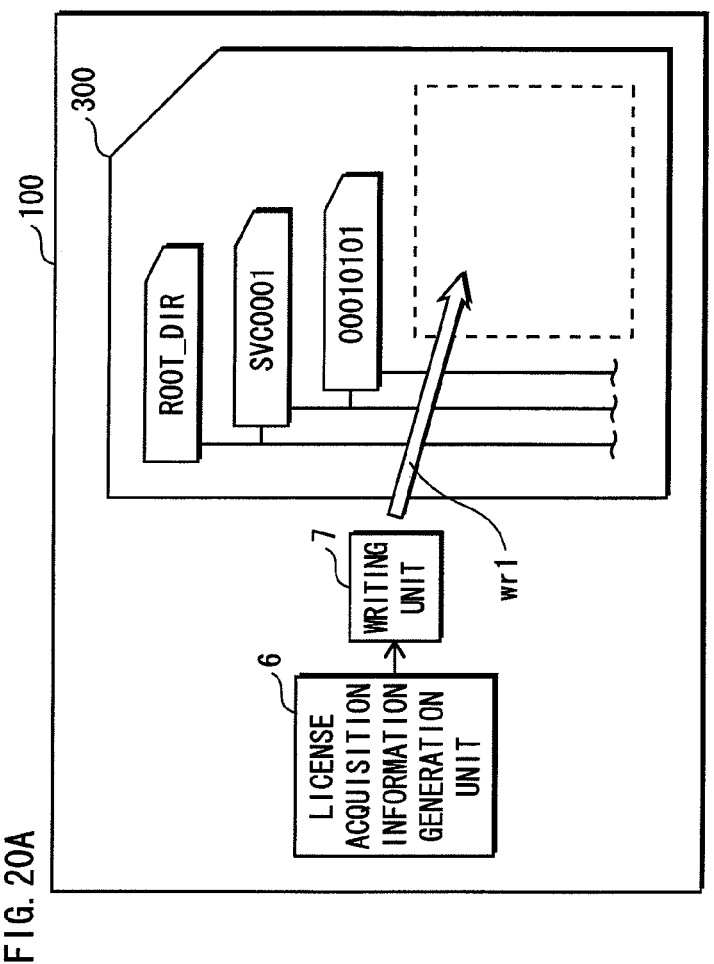
FIG. 20A is a diagram showing a stage where a license acquisition information generation unit 6 writes the license acquisition information onto the memory card 300.
Figure 20B:
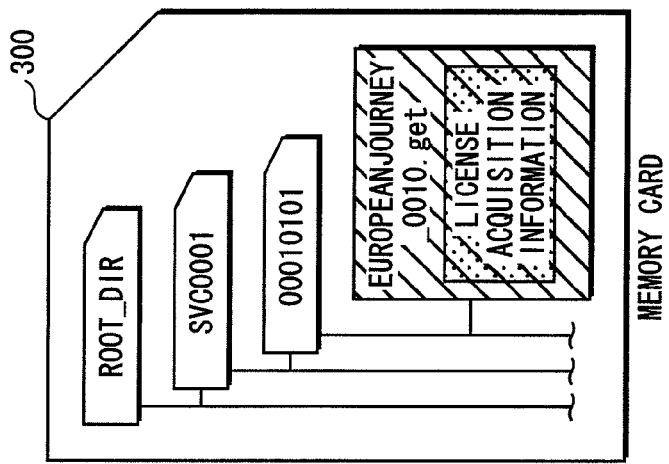
FIG. 20B is a diagram showing the storage content of the memory card 300 to which the writing has been performed.

FIG. 20A is a diagram showing a stage where a license acquisition information generation unit 6 writes the license acquisition information onto the memory card 300, and FIG. 20B is a diagram showing the storage content of the memory card 300 to which the license acquisition information has been written. The license acquisition information shown in FIG. 9 is written to the memory card 300 through the processing shown in FIGS. 19 and 20.

Figure 20C:
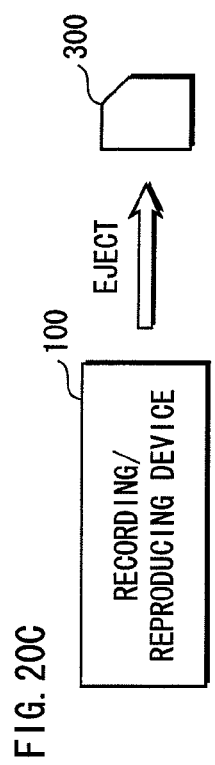
FIG. 20C is a diagram showing that the memory card 300 is removed (ejected) from the recording/reproducing device 100.

FIG. 20C is a diagram showing that the memory card 300 is removed (ejected) from the recording/reproducing device 100.

Figure 20D:
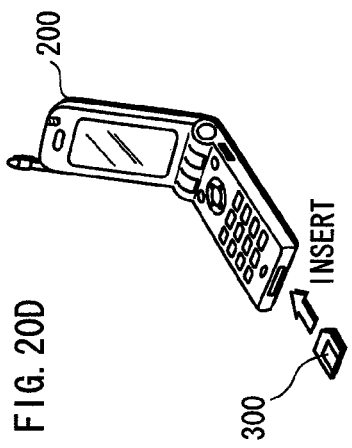
FIG. 20D is a diagram showing that the memory card 300 is inserted into the portable communication device 200.

FIG. 20D is a diagram showing that the memory card 300 is inserted into the portable communication device 200. When the memory card 300 is inserted, the license acquisition information is supplied to the portable communication device 200.

FIGS. 21 and 22 are diagrams that schematically describe the process up to the point where the license information and the license management information are made available for authentication by the recording/reproducing device. FIG. 21A is a diagram showing that the portable communication device 200 is downloading the license information and the license management information, and FIG. 21B is a diagram showing a stage where the downloaded license information and the license management information are being written to the memory card 300. FIG. 21C is a diagram showing the storage content of the memory card 300 after the writing has been performed. The license information and the license management information shown in FIG. 13 are written to the memory card 300 through the processing shown in FIGS. 19 and 20.

Figure 22A:
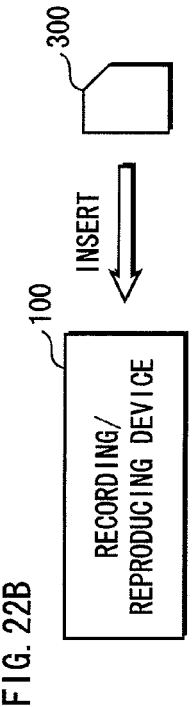
FIG. 22A is a diagram showing that the memory card 300 is removed (ejected) from the portable communication device 200.
Figure 22B:
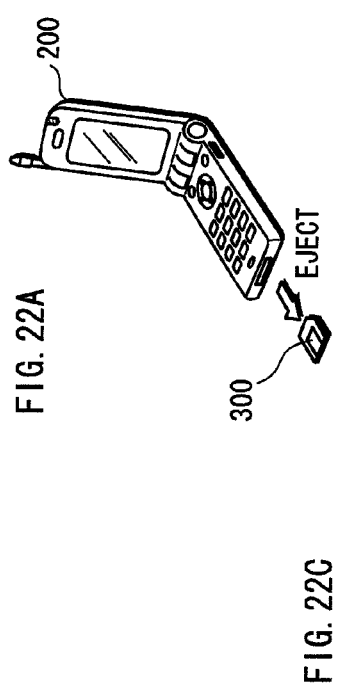
FIG. 22B is a diagram showing that the memory card 300 is inserted into the recording/reproducing device 100.
Figure 22C:
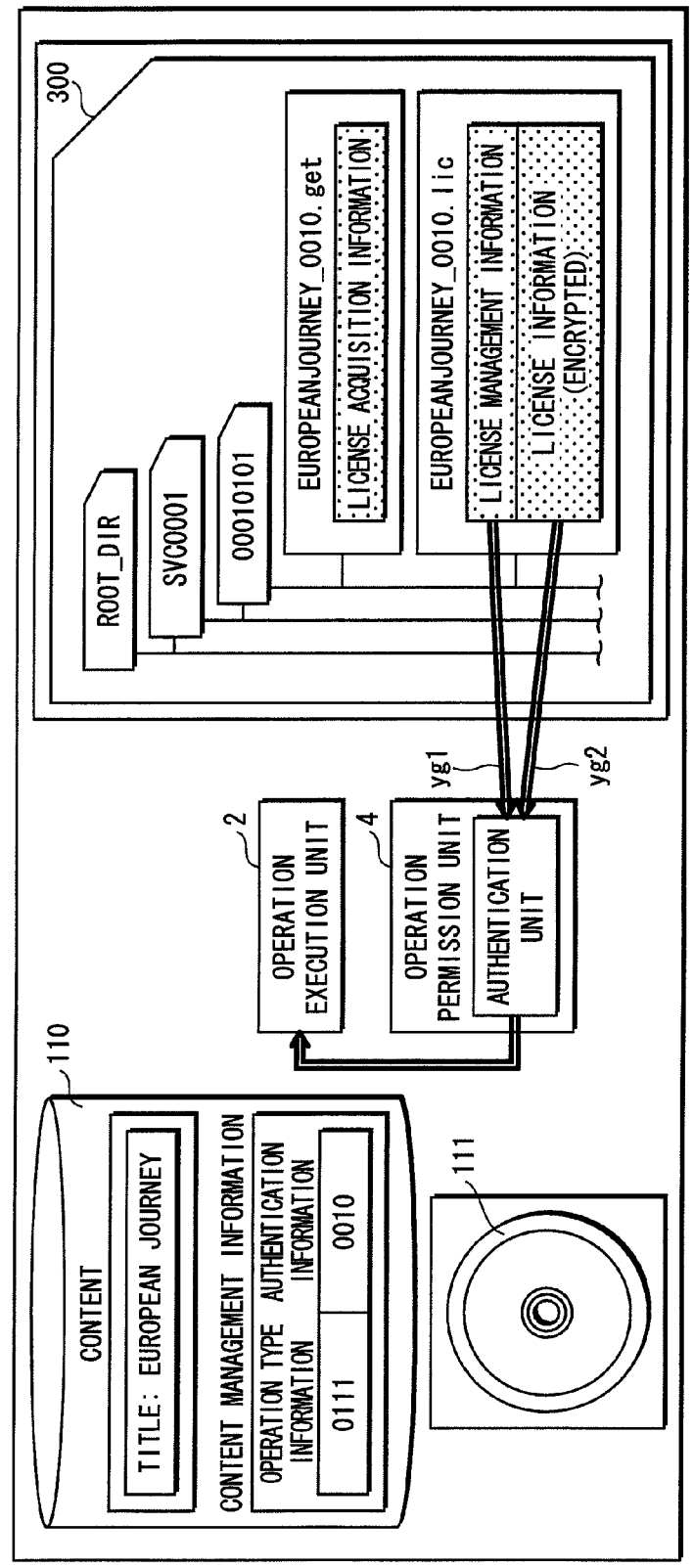
FIG. 22C is a diagram showing a stage where a decryption unit 9 compares the license information with the license management information.

FIG. 22A is a diagram showing that the memory card 300 is removed (ejected) from the portable communication device 200, and FIG. 22B is a diagram showing that the memory card 300 is inserted into the recording/reproducing device 100. FIG. 22C is a diagram showing a stage where the verification of the license information and the license management information has been performed by the decryption unit 9. The arrows yg1 and yg2 in the figure represent this verification. It can be seen that the license information and the license management information are made available for authentication through the above-described processing.

Figure 23A:
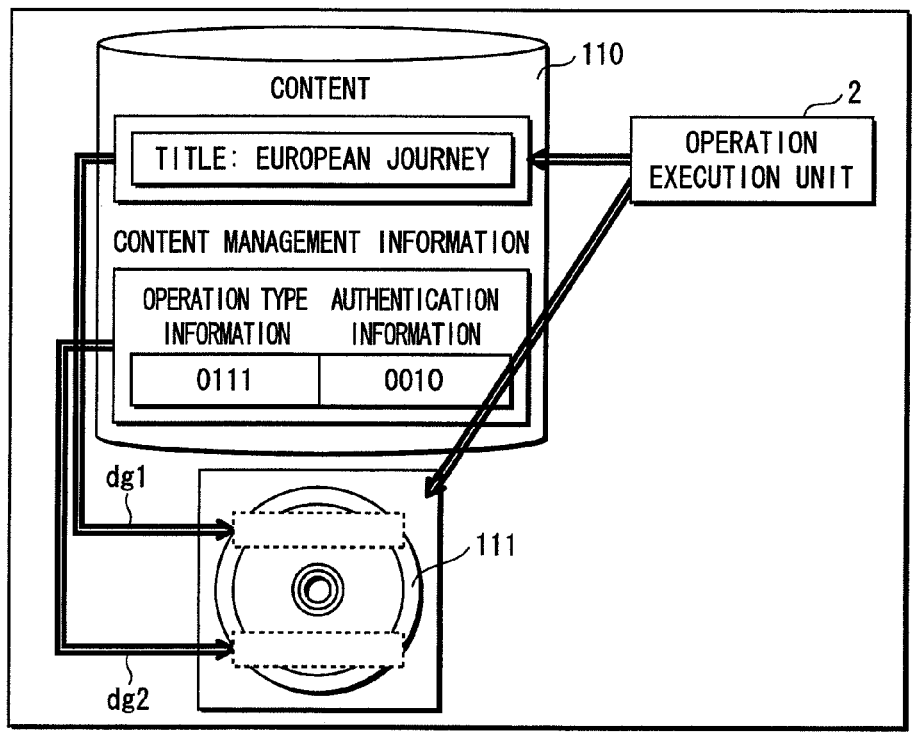
FIG. 23A is a diagram showing that the operation execution unit 2 copies the content.
Figure 23B:
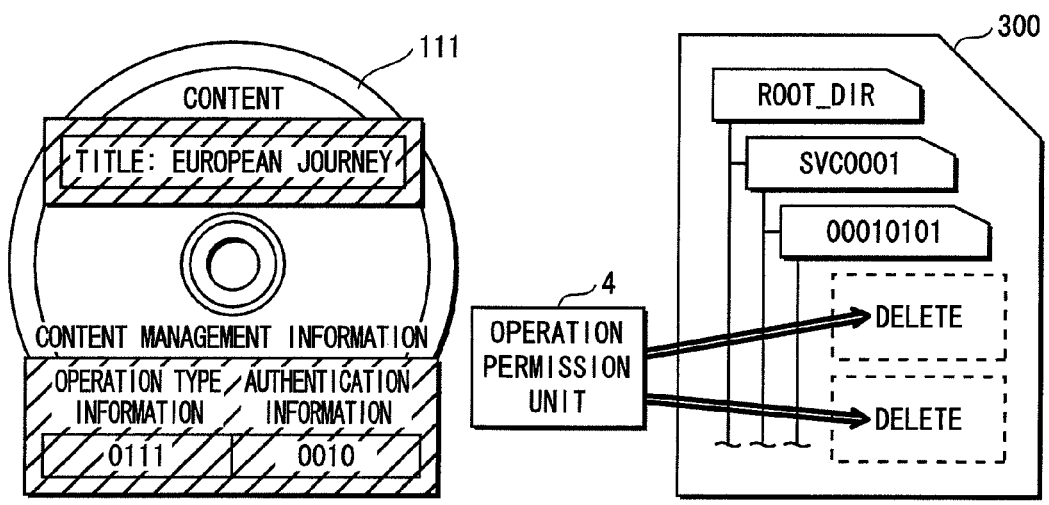
FIG. 23B is a diagram showing the storage contents of a DVD drive 111 and the memory card 300 after the copying has been performed.

FIGS. 23A and 23B are diagrams schematically showing the processing where the copy operation is performed based on the license information and the license management information. FIG. 23A is a diagram showing that the content is being copied by the operation execution unit 2. The arrows dg1 and dg2 in FIG. 23A represent the copy operation of the content. FIG. 23B is a diagram showing the storage content of the DVD drive 111 and the storage content of the memory card 300 after the copying has been performed. The content "European journey" in FIG. 5 is copied onto the DVD drive 111 through the above-described processing.

By undergoing the above-described processing, the copy operation of the content is performed based on the license information.

With the present embodiment described above, the aforementioned license management information indicates a type of identifier used for decryption. When the decryption processing is performed using the type of identifier indicated by the license management information, the encrypted license information can be decrypted. Even if a user changes an identifier necessary for decryption of the license information, as long as the identifier is indicated by the license management information, the license information is legitimately decrypted by the recording/reproducing device. With this structure, when an identifier unique to an apparatus is adopted as the identifier for decryption, a place for using a certain content can be restricted to the specific apparatus. Also, when an identifier unique to a single person is adopted as the identifier for decryption, an entity that uses the content can be restricted to the specific person. Conversely, if an identifier unique to a specific organization is adopted as the identifier for decryption, an entity that uses the content can be expanded to all the members in the organization.

With the above-described structure, a place to use a content and an entity that uses the content can be changed as desired. Therefore, the operations of a content are performed, depending on situations in which the content is used, thereby enhancing convenience to users.

(Second Embodiment)

Figure 24:
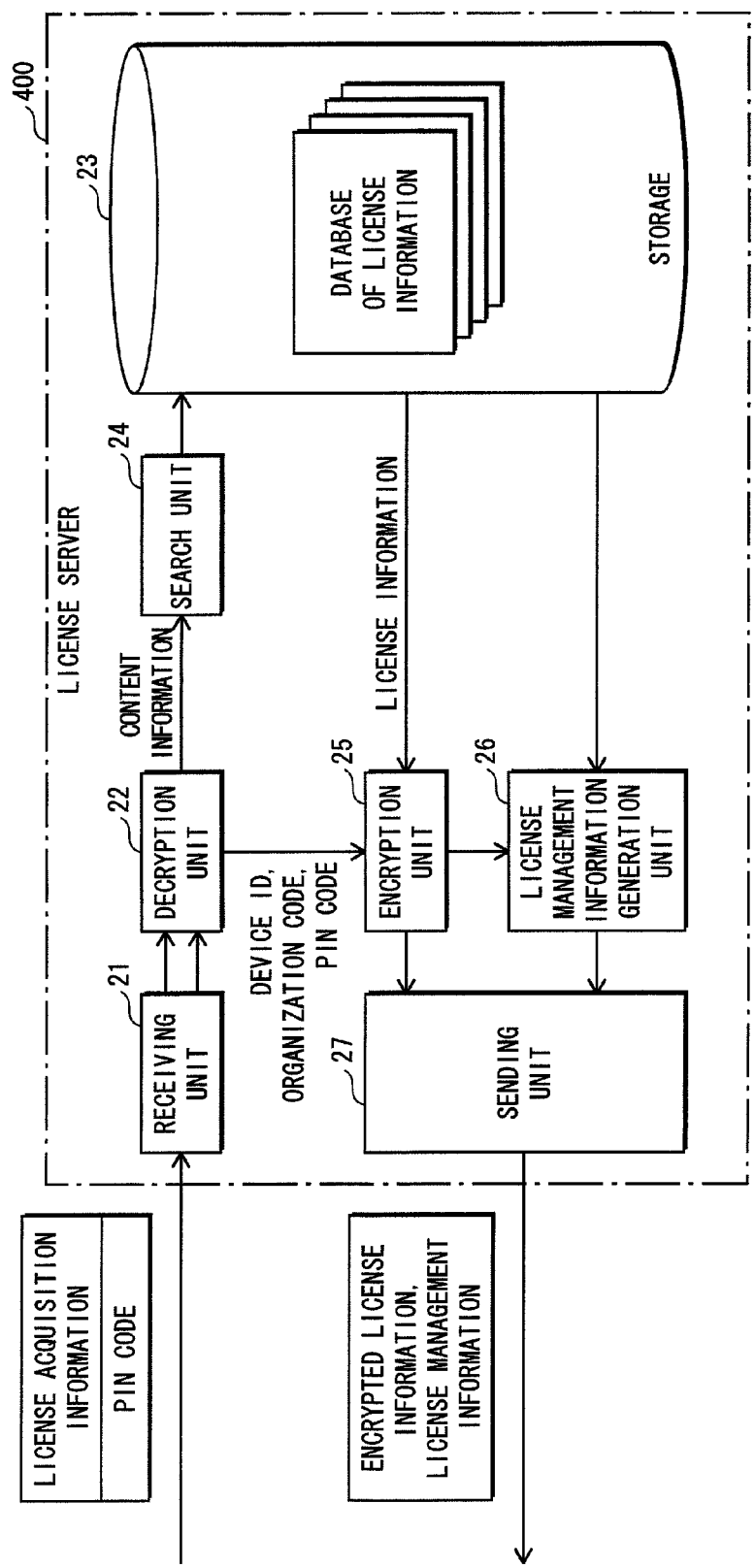
FIG. 24 shows a diagram showing the internal structure of the license server 400.

In the first embodiment, the encryption of the license information is performed by the portable communication device. In the second embodiment, however, the encryption of the license information is performed by the license server. FIG. 24 shows a diagram showing the internal structure of the license server 400. As shown in the figure, the license server 400 includes a receiving unit 21, a decryption unit 22, a storage unit 23, a search unit 24, an encryption unit 25, and a license information generation unit 26.

The receiving unit 21 receives the combination of the license acquisition information and the PIN code that are sent from the recording/reproducing device.

The decryption unit 22 decrypts, with use of the received PIN code, the encrypted information ID included in the license acquisition information that has been sent from the recording/reproducing device.

The storage 23 is a database in which the license information for each content is stored.

The search unit 24 searches the database in the storage 23 by using, as a keyword, the content information included in the license acquisition information, and reads the license information corresponding to the content management information from the storage 23.

The encryption unit 25 encrypts, with use of the information ID acquired from the receiving unit 22, the license information corresponding to the content management information.

The license management information generation unit 26 generates the license management information that includes (i) the content management information and the operation type information that are included in the license information, and (ii) the type ID that indicates the information ID used for the encryption of the license information performed by the encryption unit 25, and sends the encrypted license information with the license management information.

According to the present embodiment described above, the license information is encrypted in the license server. Therefore, in a case where the recording/reproducing device is a network household electric appliance, the recording/reproducing device and the license server communicate directly without the portable communication device, so that the recording/reproducing device acquires the license information.

(Third Embodiment)

The present embodiment adopts a charge system in which a charge varies depending on whether the usage range is wide or not. Here, if the use of the content is restricted to one apparatus, the charge is the lowest, and if the use of the content expands to a plurality of users who belong to one organization, the charge is the highest. In order to realize such a charge system, in the present embodiment, when sending a request for the license information to the license server, based on the license acquisition information, the portable communication device 300 processes an electronic transaction for the payment of the charge that is set according to the type of the information ID indicated by the type ID.

This information ID is determined according to the usage range. Therefore, if the information ID is the device ID, the charge is the lowest, and the charge increases in order of the PIN code, and then the organization code to be the highest.

The transaction when requesting the license information and the license management information is preferable to be processed based on the premise, of electronic commerce. In this case, the license server 400 has installed therein Merchant software, and the portable communication device has installed therein Wallet software. Furthermore, the portable communication device is connectable, via a network, to a payment gateway that is arranged in a financial institution. On the network, SET (Secure Electric Transaction) is used to realize a credit card transaction. The portable communication device sends order information to the license server 400, and also sends payment information to the payment gateway. Upon receiving the order information, the license server 400 sends the license information and the license management information to the portable communication device. Since the order information and the payment information are sent separately, the security of the payment transaction is improved.

(Fourth Embodiment)

In the present embodiment, the change of the usage range is executed. In the present embodiment, the GUI unit 3 displays, when displaying the operation navigation, a button (usage range change button) to receive a change of the usage range. When the usage range change is confirmed via the usage range change button, the GUI unit 3 displays the usage range menu. Then, after updating, according to an operation of the menu, the type ID of the license information and the license management information, the GUI unit 3 changes the information ID that is used for the encryption of the license information. With the above-described procedure, the usage range of the content can be changed after the usage range has been initially set.

According to the present embodiment described above, the GUI unit 3 displays the usage range change button to receive the operation to change the usage range, and changes the information ID used for the encryption of the license information. Therefore, the license information that has only been available for a certain apparatus can be used for other apparatuses.

(Remarks)

Although the above describes the best mode contemplated by the applicant of carrying out the present invention at the time of filing the present application, further improvements and modifications can be applied to the following technical aspects. It should be noted that whether or not to apply these improvements and modifications can be determined arbitrarily by a person who practices the invention.

(Identifiability by a User)

In the first embodiment, the license acquisition information is encrypted with the encryption key generated from the PIN code. However, any type of information is applicable as long as the information is identifiable by the user.

(Variation of a Folder)

In the first embodiment, a folder that is uniquely determined by a service or a system is the "SVC0001" folder located immediately below the root. However, any folder is applicable as long as the folder structure and the folder name are uniquely determined by the service or the system.

(Variation of an Extension)

In the first embodiment, the extensions are ".lic" and ".get". However, any extension is applicable as long as the extension is uniquely determined by the service or the system.

(Necessity of Content Information)

In the first embodiment, the license information is encrypted with an encryption key generated with use of the content information, the device ID unique to the memory card 300, and the information ID corresponding to the type ID indicated by the license management information. However, the content information does not always need to be used for generating the encryption key. Any type of information is applicable as long as the information is determined uniquely by the service or the system.

(Legitimacy of the License Information)

In the present embodiments, whether or not the license information for the content operation is legitimate is judged by determining whether or not the content information and the operation type information that are included in the license management information, and, the content information and the operation type information that are included in the decrypted license information are consistent. However, whether or not the license information for the content operation is legitimate may be judged by determining whether or not the decrypted license information is legitimate.

(Data Used for Encrypting the License Information)

As described above, the license information is encrypted with an encryption key generated with use of the content information, the device ID unique to the memory card 300, and the information ID corresponding to the type ID indicated by the license management information. However, the content information does not always need to be used for generating the encryption key. Any type of information is applicable as long as the information is determined uniquely by the service or the system.

(Encryption of the License Information)

In the present embodiments, the license information acquired by accessing the content server is in plain text. However, the license information may be encrypted by using the content information and such. In other words, any information is applicable as long as an apparatus that uses the license information can acquire the information that has been used for encrypting the license information.

As described above, the license information is encrypted with an encryption key generated with use of the content information, the device ID unique to the memory card 300, and the information ID corresponding to the type ID indicated by the license management information. However, the content information does not always need to be used for generating the encryption key. Any type of information is applicable as long as the information is determined uniquely by the service or the system.

(License Acquisition Information)

As described above, the license acquisition information is encrypted with the encryption key generated with use of the PIN code. However, any type of information is applicable as long as the information is identifiable by the user.

In the first embodiment, the license acquisition information is generated when a user selects "purchase license" while the operation navigation is displayed. However, the license acquisition information may be generated when a user makes a request for an operation. In other words, the license acquisition information may be generated if a request is made by a user, and the authentication information is defined such that the operation corresponding to the request requires authentication.

(Folder Immediately Below the Root)

As described above, a folder that is uniquely determined by the service or the system is the "SVC0001" folder located immediately below the root. However, any folder is applicable as long as the folder structure and the folder name are uniquely determined by the service or the system.

Also, as described above, the extensions are ".lic" and ".get". However, any extension is applicable as long as the extension is uniquely determined by the service or the system.

(Content Display)

The content stored in the HD drive 110 and the DVD drive 111; may be displayed as an icon on the GUI of the apparatus. Then, the content may be played back or copied according to a double-click operation to the icon in the GUI, or a drag and drop operation thereto.

(Recoding Mode)

The recording/reproducing device may include a recording mode storage-unit that stores the setting of a recording mode determined by a user. Here, the recording mode includes four types of mode, namely XP, SP, LP, and EP. Each of the four types of modes is allocated a unique bit rate, for example, XP is allocated 10 Mbps, SP is allocated 5 Mbps, LP is allocated 2.4 Mbps, and EP is allocated 1.6 Mbps. A user can cyclically change, by pressing a button of a remote controller of the recording/reproducing device or a button of the front panel of the recording/reproducing device, the current recording mode stored in the recording mode storage unit 7, such that the recording mode switches in order of XP, SP, LP, EP. By way of the change of the recording mode, the user can freely set a bit rate (the quality of a recorded image). Furthermore, among the recording modes, the user may determine whether or not the license is necessary according to the recording mode. For example, the user may determine that the license needs to be purchased for operations of the content recorded in XP or SP mode, and that the license does not need to be purchased for operations of the content recorded in LP or EP mode.

(Variation of the Recording/Reproducing Device)

In a case where the portable communication device 200 is capable of recording and playing the content, the portable communication device 200 may have the functions of the recording/reproducing device 100.

(Implementation of the Control Procedures)

The control procedures shown in the flowcharts and the control procedures executed by the functional components in the above embodiments are actually realized by hardware resources. In this sense, these control procedures can be regarded as the creation of a technical idea utilizing natural laws. Hence, these control procedures meet the requirement as an "invention of a program".

Production of the Program According to the Present Invention

The program of the present invention is a program (object program) in an executable format, which can be executed on a computer, and composed of one or more program codes that cause the computer to execute each step in the flowcharts used in the descriptions of the present embodiments or each procedure of the functional components. Here, program codes come in various types such as the native code of a processor, and JAVA™ bytecode. Also, there are various forms of realizing the steps of the program codes. For example, in a case where each step can be realized by using external functions, call statements for calling the external functions are used as the program codes. Also, program codes that realize one step may belong to separate object programs. In the RISC processor in which the types of instructions are limited, each step of flowcharts may be realized by combining arithmetic operation instructions, logical operation instructions, branch instructions and the like.

The program according to the present invention can be produced in the following manner. First, a software developer creates source programs which realize the above flowcharts and functional components using a programming language. When doing so, the software developer creates such source programs that realize the above flowcharts and functional components, using class structures, variables, array variables, and calls for external functions according to a syntax of the programming language.

The created source programs are supplied to a compiler as files. The compiler translates these source programs to generate object programs.

The translation by the compiler includes processes such as syntax analysis, optimization, resource allocation, and code generation. In the syntax analysis, lexical analysis, syntax analysis, and semantic analysis of the source programs are performed to convert the source programs to intermediate programs. In the optimization, operations such as basic blocking, control flow analysis, and data flow analysis are performed on the intermediate programs. In the resource allocation, the variables in the intermediate programs are allocated to registers or memories in a target processor, in order to adapt to an instruction set of the target processor. In the code generation, each intermediate instruction in the intermediate programs is converted to a program code to thereby obtain the object programs.

After the object programs are generated, a programmer activates a linker for the object programs. The linker allocates the object programs and relevant library programs to memory space, and links them together to generate a load module. Such a generated load module is assumed to be read by a computer, and causes the computer to execute the procedures of the flowcharts and the procedures of the functional components in the above embodiments. As a result of the above processes, the program according to the present invention can be produced.

The program of the present invention can be used as follows. When the program of the present invention is used as an embedded program, the load module that is the program is written into a code ROM, together with the Basic Input/Output System (BIOS) program and various types of middleware (operation system). The code ROM is then installed in a control unit and executed by a CPU. In this way, the program according to the present invention can be used as a control program of the recording/reproducing device.

When the recording/reproducing device is a bootstrap model, the Basic Input/Output System (BIOS) is embedded in the code ROM, and various types of middleware (operation system) are preinstalled in a secondary recording medium such as a hard disk. Also, a boot ROM for activating the system from the secondary recording medium is provided in the recording/reproducing device. In this case, only the load module is supplied to the recording/reproducing device via a portable recording medium or a network, and installed in the second recording medium as one application. As a result, the recording/reproducing device bootstraps the system using the boot ROM to activate the operation system, and causes the CPU to execute the installed load module as one application so that the program of the present application can be used.

The recording/reproducing device of a bootstrap model may use the program according to the present invention as one application. Therefore, the program according to the present invention can independently be assigned, leased, or supplied via a network.

(CPU, ROM)

The CPU and the ROM that realize the function of the recording/reproducing device can each be realized as one system LSI.

A system LSI is a circuit formed by implementing a bare chip on a high-density substrate and packaging them. The system LSI includes a plurality of bare chips having an external structure that looks as if the bare chips were one LSI, by implementing the plurality of bare chips on a high-density substrate and packaging them (such a system LSI is called a multi-chip module).

Here, there are two types of package for a system LSI, namely QFP (Quad Flat Package) and PGA (Pin Grid Array). In the QFP-type system LSI, pins are attached to the four sides of the package. In the PGA-type system LSI, numerous pins are attached to the entire bottom surface of the package.

These pins serve as interfaces between the system LSI and other circuits. Since pins in a system LSI have such interface functions, the system LSI acts as the core of the recording/reproducing device when the pins of the system LSI are connected to the other circuits.

Figure 25:
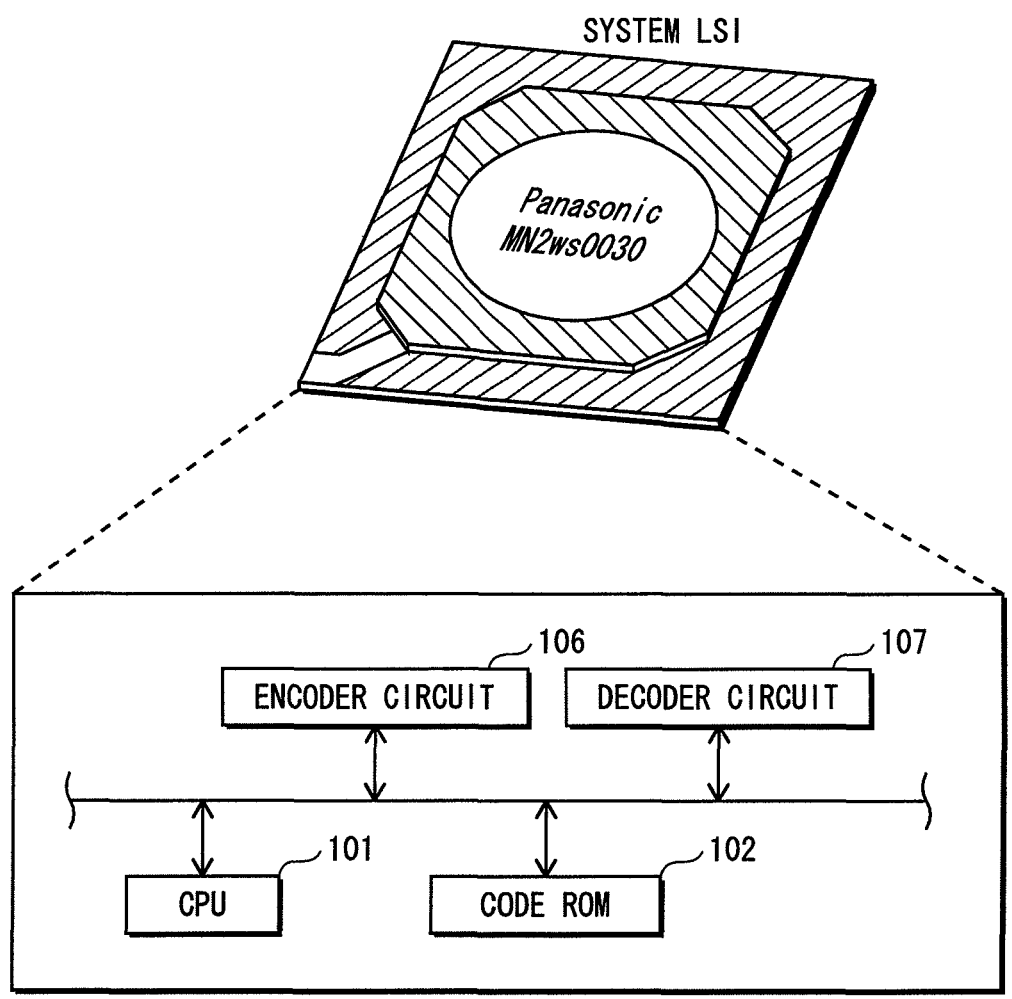
FIG. 25 is a diagram schematically showing a system LSI according to the present invention.

As described in the above "use as an embedded program" section, the load module which is the program, the Basic Input/Output System (BIOS), and the various types of middleware (operation system) are written into the code ROM. Since the present embodiments especially relate to the creation of the load module that is the program, the system LSI according to the present invention can be produced by implementing therein the code ROM storing the load module that is the program. FIG. 25 is a diagram schematically showing a system LSI according to the present invention. As shown in FIG. 25, the system LSI according to the present invention includes the above-described code ROM, CPU, and RAM in the package.

The following describes the details of a specific production procedure. First, a circuit diagram of the part to be the system LSI is created based on the block diagrams shown in the present embodiments. Then, components in the block diagrams are embodied with use of circuit devices, ICs, or LSIs.

After each of the components is embodied, buses that connect between the circuit devices and ICs or LSIs, the peripheral circuits of the buses, an interface with the outside, and such are specified. Furthermore, connection lines, power lines, ground lines, clock signal lines and such are also specified. In the above-described specifications, adjustments such as adjusting the operation timing of each component in view of the specifications of LSIs, guaranteeing a bandwidth required for each component are made, so that the circuit diagram is completed.

After the circuit diagram is completed, an implementation design is made. The implementation design is a work for creating a substrate layout to determine where on the substrate the components (circuit devices, ICs or LSIs) shown in the circuit diagram created by the circuit design are arranged, or how the connection lines shown in the circuit diagram are wired on the substrate.

Here, the implementation design includes an automatic arrangement and an automatic wiring.

In a case where a CAD device is used for the implementation design, this automatic arrangement can be realized by using a specific algorithm called "centroid method". In the automatic wiring, connection lines used for connecting pins of the components shown in the circuit diagram are specified using metal foils and vias. In a case where the CAD device is used, this wiring process can be realized by using a specific algorithm called "maze method" and "line search method".

Figure 26:
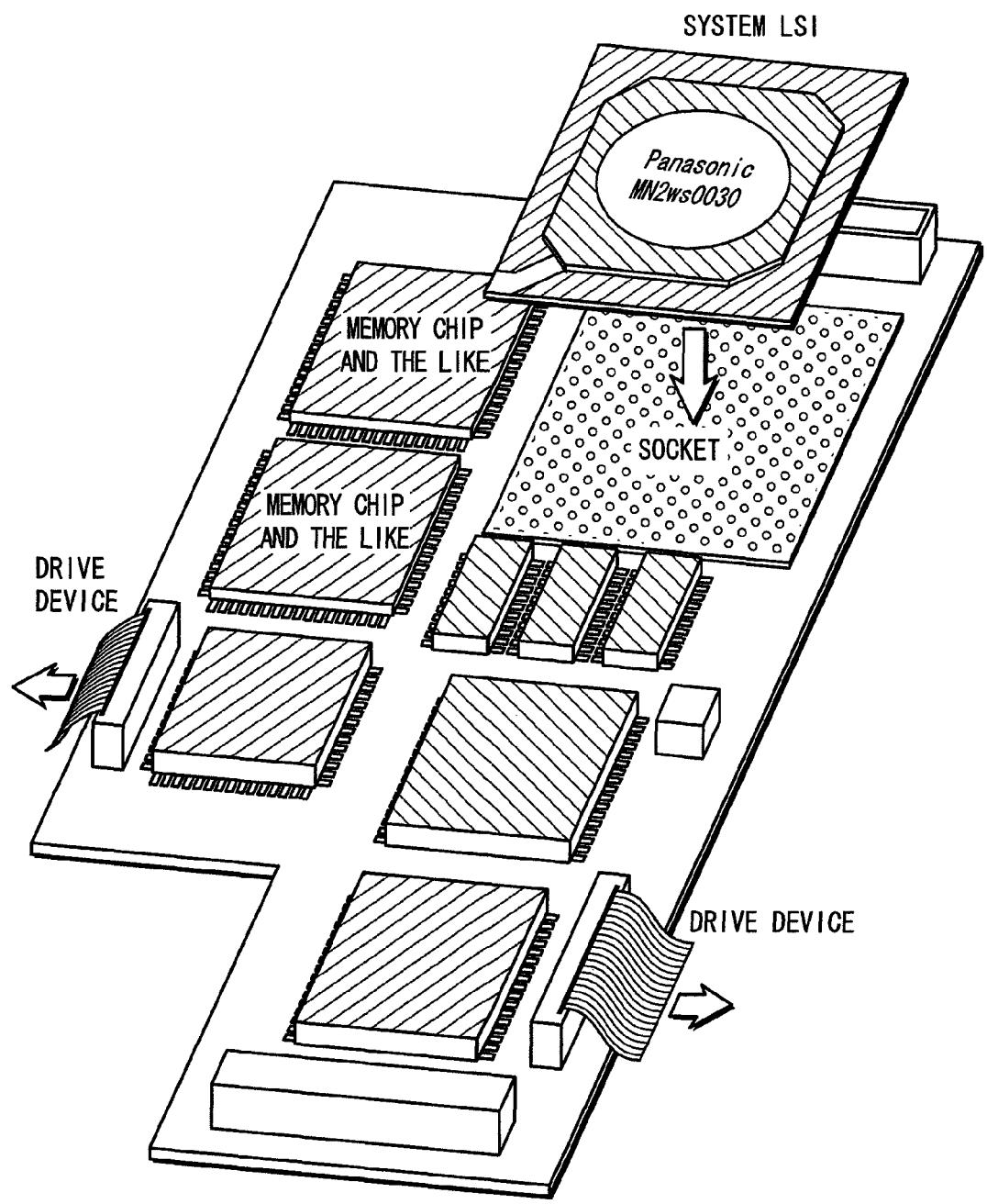
FIG. 26 is a diagram schematically showing how to mount the system LSI according to the present invention.

After the implementation design is made and the layout on the substrate is finalized, a result of the implementation design is converted into CAD data and output to equipment such as NCmachine tools. The NCmachine tool performs SoC implementation and SiP implementation based on the CAD data. The SoC (System on Chip) implementation is a technique to burn a plurality of circuits on one chip. The SiP (System in Package) implementation is a technique to combine a plurality of chips into a single package using a resin or the like. Through the above-described processing, the system LSI according to the present invention can be produced based on the internal structure diagrams of the recording/reproducing device described in the present embodiments. As shown in FIG. 26, when the system LSI produced through the above-described processing is mounted in the recording/reproducing device, the manufacture of the recording/reproducing device described in the above-described embodiments is realized.

Note that the integrated circuits produced as described above may be referred to as IC, LSI, super LSI, or ultra LSI, depending on the degree of integration.

Furthermore, part or all of the components of the recording/reproducing device may be formed as one chip. The integration is not limited to the above-described SoC implementation and SiP implementation, but may be realized by a dedicated circuit or a general process. For example, an FPGA (Field Programmable Gate Array) that can be programmed or a reconfigurable processor that can reconfigure the connection and settings of the circuit cells in the LSI may be used for the integration after the LSI is produced. Furthermore, if an integration technique that replaces LSIs emerges as a result of the advance of a semiconductor technique or a derivative technique, such a technique may be used to integrate function blocks. For example, biotechnology may be adapted as such a technology.

(Architecture)

The system LSI according to the present invention is assumed to be installed in the recording/reproducing device. Therefore, it is preferable that the system LSI is in conformity with a UniPhier architecture.

The system LSI in conformity with the UniPhier architecture is composed of the following circuit blocks.

Data Parallel Processor DPP

The data parallel processor DPP is an SIMD-type processor in which a plurality of element processors simultaneously perform the same operation, and parallelizes decoding processing of a plurality of pixels that constitute an image by causing arithmetic logic units installed in the element processors to operate simultaneously by a single instruction. Realizing such parallelization achieves decoding of video stream. The aforementioned video decoder is implemented as the data parallel processor.

Instruction Parallel Processor IPP

The instruction parallel processor IPP is composed of an instruction RAM, an instruction cache, a data RAM, and a "Local Memory Controller" including a data cache, an instruction fetch unit, a decoder, an execution unit, and a "Processing Unit" including a register file, and a "Virtual Multi Processor Unit" that causes the Processing Unit to simultaneously execute parallelization of a plurality of applications.

CPU Block

The CPU block is composed of an ARM core, an external bus interface (Bus Control Unit: BCU), a DMA controller, a timer, a peripheral circuit such as a vector interrupt controller, a UART, a GPIO (General Purpose Input Output), and a peripheral interface such as a synchronous serial interface. The aforementioned controller is implemented in the system LSI as the CPU block.

Stream I/O Block

The stream I/O block performs data input/output with a drive unit, a hard disk drive unit, an SD memory card drive unit that are connected to external buses via a USB interface or an ATA Packet.

AVI/O Block

The AVI/O block is composed of an audio input/output, a video input/output, and an OSD controller, and performs data input/output with a TV and an AV amplifier.

Memory Control Block

The memory control block realizes reading and writing of an SD-RAM that is connected thereto via the external bus, and is composed of an internal bus connection unit that controls an internal connection between each block, an access control unit that transfers data with the SD-RAM connected to the outside of the system LSI, and an access schedule unit that adjusts requests from the blocks for accessing the SD-RAM.

It is preferable to adopt a bottom-up layout technique for manufacturing the system LSI in conformity with the aforementioned architecture. In the bottom-up layout technique, one chip layout is completed by making a layout design for each circuit block such as the IPP and the DPP, optimizing the performance of the circuit blocks, and then building up the circuit blocks.

(Variation of Contents)

The digital stream that is included in the content in each of the embodiments may be obtained by being real-time encoded by the encoder circuit 106.

The methods of the real-time recording include the method described in the present embodiment, self-encoding that voluntarily encodes a digital signal or an analog signal that are input, and an outside encoding. The outside encoding means that digital data that has been encoded by another device is recorded on a disc without further being encoded. Specifically, the present invention is also applicable in a case of performing partializing processing on a transport stream of a multi-program type and then writing the partial transport stream onto the recording medium.

Also, the digital stream of the content may be obtained by encoding an analog/digital image signal recorded on a video tape. Furthermore, the digital stream may be obtained by encoding an analog/digital signal image signal that is directly captured by a video camera. In addition, the digital stream may be distributed by a distribution server.

Yet further, the content may contain only audio stream, not video stream.

(Receiving an Operation Request)

In each of the above-described embodiments, an operation request from a user is received from a remote controller. However, the operation request may be received from the front panel of the recording/reproducing device. Also, the request from the user may be received by an input device such as a keyboard, touch panel, mouse, touch pad, or trackball. In this case, the operation may be received by a click operation or a drag operation.

(Embodiment of the Method Invention)

The element of "time" in each of the steps that is performed on the time series in the flow charts is assumed to be necessary in order to specify the present invention. When the processing of the steps in the above flow charts on the time series is performed, the intended purpose of deleting a non reference area is achieved and the operation and effect can be attained. Therefore, the methods that are described in the flow charts can be regarded as the creation of a technical idea utilizing natural laws, and each of the methods described in the respective flow charts can be independently provided as an invention. Hence, the act of performing the processing of the above flow charts so as to achieve the intended purpose of deleting a non reference area and thereby attain the operation and effect meets the requirement as the implementation of the recording method of the present invention.

(Recording Medium of the Content)

In the above-described embodiments, the recording medium that stores a content is assumed to be a hard disk or a DVD. However, the physical features of these do not significantly contribute to the achievement of the operation and effect of the present invention. The recording medium is not only limited to such, but other recording medium can be adopted as long as the recording medium has an enough capacity to record a content. Such examples include: an optical disc such as a CD-R, a CD-RW, or a Blue-ray Disc; a Magneto-optical disk such as a PD or an MO; a semiconductor memory card such as an SD memory card, a Compact Flash™ card, a SmartMedia, a Memory Stick, a MultiMediaCard, or a PCM-CIA card; a magnetic recording disk such as a flexible disk, a SuperDisk, a Zip, or a Clik!; and a removable hard disk drive such as an ORB, a Jaz, a SparQ, a SyJet, an EZFley, or a Microdrive.

(Computer)

The computer described in the present invention is a tangible entity composed of an I/O circuit, a memory, a processing circuit (processor) and such. Among these components, the processing circuit (processor) acts as the core of the computer, and includes, as the minimum components, a "fetch circuit" that fetches an instruction code from an instruction memory or a cache, a "decoder circuit" that decodes the instruction code, an "arithmetic operation circuit" that performs arithmetic operations on holding values stored in a register, according to a result of the decoding. As described above, the computer in the present description can be understood as a von Neumann-type computer equipped with a CPU. However, the type of computer in the present description is not limited to such, but may include a computer equipped with a processing circuit that are called a digital signal processor, an I/O processor, or a media core processor. These types of computer perform certain processing for a hardware resource according to a performance result of the processing circuit.

(Location of the License Information and the License Management Information that are Acquired by the Recording/Reproducing Device)

In a case where a network connection function exists in the recording/reproducing device, the license information and the license management information may be arranged in a network instead of on a recording medium such as a memory card. Then, the recording/reproducing device may acquire the license information and the license management information via the network on a timely basis.

(Short Distance Wireless Communication Function)

In a case where the recording/reproducing device has a short distance wireless function, but not a function to access a network, the license information may be arranged in a communication terminal that can perform a wireless communication with the recording/reproducing device.

(Variation of the Information ID in the License Acquisition Information)

The information ID included in the license acquisition information may be the information that specifies a medium such as a SIM card or a B-CAS card, or the information that specifies a contractor. Here, the SIM card is an IC card that stores contractor information.

The information ID used for decrypting the encrypted information ID in the license acquisition information is not limited to the information ID unique to a person such as the PIN code, but may be the information ID unique to a device such as a portable communication device.

(Location of a Database)

A database that stores a plurality of license information and the corresponding license management information does not always exist in a server device. Instead, the database may exist in a storage device that is independent from the server device. Then, the server device may acquire, from the storage device, the license information and the license management information that correspond to the combination of a content to be an operation target and an operation to be executed, via the network.

(Variation of Copying)

The copy operations in the above-described embodiments include moving and copying. Here, the moving means the copy processing that includes a step for deleting a copy source content, and the copying means the copy processing that does not include the step for deleting the copy source content. The information ID used for decrypting the license information may be different for each of the operations included in the copy operation. In this case, the operation type information is represented by bits corresponding to the operations of moving and copying. Also, the type ID is represented by partial bits corresponding to these operations. Then, the information ID used for decrypting the license information is different between the moving operation and the copy operation.

Also, a checkout operation may be specified in the operation type information and the type ID, separately from the copy operation. Here, the "checkout" is a type of copying operation in which the number of permitted copying is restricted. Therefore, the copying of the content is executed after the number of permitted copying is decremented by one.

The checkout operation is different from the general copying operation in which the number of permitted copying is limited, in terms of being capable of incrementing the number of copying. The number of copying is incremented after a check-in process has completed. The check-in process is a process to disable the playback of the content that has been copied on a recording medium.

The above embodiments disclose the internal structures of the recording medium and the recording/reproducing device according to the present invention, and it is obvious that the recording medium and the recording/reproducing device are manufactured in volume based on the disclosed internal structure. Therefore, the recording medium and the recording/reproducing device can be used industrially. Hence the recording/reproducing device according to the present invention has industrial applicability.

The invention claimed is:

1. A system including a portable communication terminal and a recording/reproducing device, wherein
the portable communication terminal comprises: a processor; and a non-transitory memory unit storing therein a program that when executed by the processor causes the processor to perform steps of: (i) transmitting, to a server, license acquisition information recorded on a portable recording medium; (ii) reading encrypted license information and the license management information from the portable recording medium; and (iii) receiving, from the server, encrypted license information and license management information corresponding thereto and recording the encrypted license information and the license management information onto the portable recording medium,
the recording/reproducing device comprises:
a processor; and
a non-transitory memory unit storing therein a program that when executed by the processor causes the processor to perform steps of:
acquiring the encrypted license information and the license management information, wherein license management information includes content information and operation type information;
decrypting the encrypted license information and obtaining license information in plain text, wherein the license information includes content information and operation type information;
executing authentication by comparing the license management information and the license information, wherein the authentication further comprises: judging a consistency between (i) the content information and the operation type information that are included in the license management information and (ii) the content information and the operation type information that are included in the license information; and
executing an operation for content, based on the license information in plain text, wherein the execution of the operation is performed only when a consistency between the license information and the license management information is certified by a comparison result of the authentication,
wherein the license information is any one of (i) license information for a device to use the content, (ii) license information for a user to use the content, and (iii) license information for an organization to use the content,
wherein the acquiring of the encrypted license information and license management information further comprises:
receiving a specification of a usage range of the content, the usage range being (i) unique to the device, (ii) unique to the user, or (iii) unique to the organization,
generating license acquisition information for acquiring license information corresponding to the usage range; and
recording the license acquisition information onto the portable recording medium and passing the license acquisition information on the portable recording medium to the portable communication terminal,
wherein the decryption of the encrypted license information is performed by selecting and using, as an encryption key, an identifier that corresponds to the license management information, the identifier being selected from among an identifier unique to the device, an identifier unique to the user, and an identifier unique to the organization.

2. The system of claim 1, wherein
each piece of the content information includes an identifier of a content and/or a title character string,
each piece of the operation type information has a bit string, each bit of the bit string corresponding to a different one of the operations for the content and each bit value indicating whether an execution of the corresponding operation is valid or invalid, and
the comparison during the authentication is performed by judging a consistency between (i) the identifier of the content and/or the title character string of the content information and the bit string of operation type information that are included in the license management information and (ii) the identifier of the content and/or the title character string of the content information and the bit string of operation type information that are included in the license information.

3. The system of claim 2, wherein
the program causes the recording/reproducing device to further perform steps of:
updating the license information and the license management information according to the execution of an operation, wherein
the update of the license information and the license management information is executed by changing a bit value of a bit string of operation type information corresponding to an operation that has been executed, and
writing, to the portable recording medium, (i) encrypted license information obtained by encrypting the license information in plain text whose bit value has been changed and (ii) the license management information whose bit value has been changed.

4. The system of claim 3, wherein
when all the bit values of the operation type information have been cleared due to a change, the update of the license information and the license management information deletes the license management information and the license information from the portable recording medium.

5. The system of claim 4, wherein
the license management information and the license information are stored in a file that is specified by a predetermined file path,
the file path includes a first folder name, a second folder name and a first file name,
the first folder name corresponds to a service name that is a provider of the content,
the second folder name corresponds to a content identifier included in the content information, and the first file name corresponds to a combination of (i) a title name included in the content information and (ii) the bit string corresponding to the operation type information included in the license management information.

6. The system of claim 1, wherein
the license management information further includes identifier type information,
the identifier type information includes:
a plurality of partial bits wherein each bit corresponds to a different one of a plurality of operations, and each bit value indicates a type of identifier to be used for decryption when executing the corresponding operation, and
the identifier used in the decryption of the encrypted license information is specified by a bit value corresponding to an operation to be executed, the bit value being selected from among a plurality of bit values of the identifier type information in the license management information.

7. The system of claim 1, wherein
the content is stored on the portable recording medium in correspondence with content management information,
the content management information includes operation type information and authentication information,
the operation type information includes a bit string, each bit of the bit string corresponding to a different one of the operations for the content and each bit value indicating whether an execution of the corresponding operation is valid or invalid,
the authentication information includes a bit string, each bit of the bit string corresponding to the different one of the operations for the content and each bit value indicating whether or not authentication processing is necessary for the execution of the corresponding operation, and
the acquisition of the license information is performed when the authentication information indicates that the authentication processing is necessary for the execution of the corresponding operation.

8. The system of claim 1, wherein
the recording/reproducing device is a standalone device and performs processing to write the license acquisition information onto the portable recording medium,
the acquisition of the encrypted license information and the license management information is performed by access to the portable recording medium on which the license acquisition information has been written,
the license acquisition information including content information that is information indicating the content, operation type information indicating a type of an operation to be executed, identifier type information indicating a type of an identifier to be used for encryption, and an identifier used for the encryption, and
the license information on the portable recording medium is downloaded by the portable communication terminal having the portable recording medium, and corresponds to a combination of (i) the content indicated by the content information and (ii) the operation indicated by the operation type information, the combination being included in the license acquisition information, and being encrypted based on an identifier whose type is indicated by the identifier type information included in the license acquisition information.

9. The system of claim 8, wherein
the license acquisition information is stored in a file that is specified by a predetermined file path,
the file path includes a first folder name, a second folder name and a first file name, the first folder name corresponds to a service name that is a provider of the content,
the second folder name corresponds to a content identifier included in the content information, and
the first file name corresponds to a combination of (i) a title name included in the content information and (ii) the bit string corresponding to the operation type information included in the license management information.

10. A system including a computer and a portable communication terminal, wherein
the portable communication terminal comprises: a processor; and a non-transitory memory unit storing therein a program that when executed by the processor causes the processor to perform steps of: (i) transmitting, to a server, license acquisition information recorded on a portable recording medium; (ii) reading encrypted license information and the license management information from the portable recording medium; and (iii) receiving, from the server, encrypted license information and license management information corresponding thereto and recording the encrypted license information and the license management information onto the portable recording medium,
the computer comprises:
a processor; and
a non-transitory memory unit storing therein a program that when executed by the processor causes the processor perform the steps of:
acquiring the encrypted license information and the license management information, wherein license management information includes content information and operation type information;
decrypting the encrypted license information and obtaining license information in plain text, wherein the license information includes content information and operation type information;
executing authentication by comparing the license management information and the license information, wherein the authentication further comprises: judging a consistency between (i) the content information and the operation type information that are included in the license management information and (ii) the content information and the operation type information that are included in the license information; and
executing an operation for content, based on the license information in plain text, wherein the execution of the operation is performed only when a consistency between the license information and the license management information is certified by a comparison result of the authentication,
wherein the license information is any one of (i) license information for a device to use the content, (ii) license information for a user to use the content, and (iii) license information for an organization to use the content,
wherein the acquiring of the encrypted license information and the license management information further comprises:
receiving a specification of a usage range of the content, the usage range being (i) unique to the device, (ii) unique to the user, or (iii) unique to the organization;
recording license acquisition information for acquiring license information corresponding to the usage range; and
recording the license acquisition information onto the portable recording medium and passing the license acquisition information on the portable recording medium to the portable communication terminal, wherein the decryption of the encrypted license information is performed by selecting and using, as an encryption key, an identifier that corresponds to the license management information, the identifier being selected from among an identifier unique to the device, an identifier unique to the user, and an identifier unique to the organization.

11. A system including a portable communication terminal and a recording/reproducing device including a system Large Scale Integrated (LSI) circuit, wherein the portable communication terminal comprises: a processor; and a non-transitory memory unit storing therein a program that when executed by the processor causes the processor to perform steps of: (i) transmitting, to a server, license acquisition information recorded on a portable recording medium; (ii) reading encrypted license information and the license management information from the portable recording medium; and (iii) receiving, from the server, encrypted license information and license management information corresponding thereto and recording the encrypted license information and the license management information onto the portable recording medium, the system LSI circuit comprises:

a processor; and a non-transitory memory unit storing therein a program that when executed by the processor causes the processor to perform steps of:

acquiring the encrypted license information and the license management information, wherein license management information includes content information and operation type information;

decrypting the encrypted license information and obtaining license information in plain text, wherein the license information includes content information and operation type information;

executing authentication by comparing the license management information and the license information, wherein the authentication further comprises: judging a consistency between (i) the content information and the operation type information that are included in the license management information and (ii) the content information and the operation type information that are included in the license information; and executing an operation for a content, based on the license information in plain text, wherein the execution of the operation is performed only when a consistency between the license information and the license management information is certified by a comparison result of the authentication, wherein the license information is any one of (i) license information for a device to use the content, (ii) license information for a user to use the content, and (iii) license information for an organization to use the content, wherein the acquiring of the encrypted license information and the license management information further comprises:

receiving a specification of a usage range of the content, the usage range being (i) unique to the device, (ii) unique to the user, or (iii) unique to the organization;

generating license acquisition information for acquiring license information corresponding to the usage range; and recording the license acquisition information onto the portable recording medium and passing the license acquisition information on the portable recording medium to the portable communication terminal, wherein the decryption of the encrypted license information is performed by selecting and using, as an encryption key, an identifier that corresponds to the license management information, the identifier being selected from among an identifier unique to the device, an identifier unique to the user, and an identifier unique to the organization.

\* \* \* \* \*